(12) United States Patent
Srivastava et al.

(10) Patent No.: US 10,540,551 B2
(45) Date of Patent: Jan. 21, 2020

(54) GENERATION OF TWO-DIMENSIONAL AND THREE-DIMENSIONAL IMAGES OF ITEMS FOR VISUAL RECOGNITION IN CHECKOUT APPARATUS

(71) Applicant: Mashgin Inc., Palo Alto, CA (US)

(72) Inventors: Abhinai Srivastava, Palo Alto, CA (US); Mukul Dhankhar, Palo Alto, CA (US); Yong Li, Beijing (CN); Maxwell William Olson, Palo Alto, CA (US)

(73) Assignee: Mashgin Inc., Palo Alto, CA (US)

( * ) Notice: Subject to any disclaimer, the term of this patent is extended or adjusted under 35 U.S.C. 154(b) by 0 days.

(21) Appl. No.: 16/180,838

(22) Filed: Nov. 5, 2018

(65) Prior Publication Data

US 2019/0236362 A1    Aug. 1, 2019

Related U.S. Application Data

(63) Continuation of application No. 15/883,355, filed on Jan. 30, 2018.

(51) Int. Cl.
*G06K 9/00* (2006.01)
*G06K 9/62* (2006.01)
(Continued)

(52) U.S. Cl.
CPC ..... *G06K 9/00671* (2013.01); *G06K 9/00201* (2013.01); *G06K 9/6272* (2013.01);
(Continued)

(58) Field of Classification Search
CPC .. G06K 9/00671; G06K 9/78; G06K 2209/17; G06N 20/00; G06F 15/18; G06Q 20/201; G06Q 20/208
See application file for complete search history.

(56) References Cited

U.S. PATENT DOCUMENTS 5,987,428 A * 11/1999 Walter ............... G01G 19/4144
                                                             177/25.15
7,100,824 B2    9/2006 Ostrowski et al.
(Continued)

FOREIGN PATENT DOCUMENTS

DE          19536294 A1    4/1997
DE      102014111656 A1    2/2016
(Continued)

OTHER PUBLICATIONS

"U.S. Appl. No. 14/517,634, Examiner Interview Summary dated Nov. 28, 2017", 2 pgs.
(Continued)

*Primary Examiner* — Michelle M Entezari
(74) *Attorney, Agent, or Firm* — Jeffrey Schox; Diana Lin

(57) ABSTRACT

Methods, systems, and computer programs are presented for capturing color images of items for a machine-learning model. In one method, a request, for adding an item to be visually recognized during sales transactions, is detected at a checkout apparatus. Further, the method includes capturing and storing a color image, by each of one or more cameras of the checkout apparatus, of an examination space when the item is present. Further, the capturing and storing of color images of the item is repeated at different poses until at a predetermined number of color images of the item are captured. Further, the method includes generating, by a processor of the checkout apparatus, additional images of the item by modifying the captured color images. A machine-learning model for item recognition is built by training a machine-learning tool with the captured images and the additional images.

30 Claims, 17 Drawing Sheets

1102 — TRANSACTIONS DATABASE

| TRAN ID | KIOSK | IMG 1 | IMG 2 | ... | IMG 8 | 3D POINT CLOUD | 3D MESH | DATE TIME | ITEM | PAYER | AMNT | NOTES | ... |
|---|---|---|---|---|---|---|---|---|---|---|---|---|---|
| 1578 | 47 | I1 | I2 | | I8 | 3D PC | 3D MESH | 20170602 194512 | COKE | JOE S | 2.49 | PRCHS | |
| 1579 | 47 | I1 | I2 | | I8 | 3D PC | 3D MESH | 20170602 194628 | APPLE | CARL S | 0.99 | REFND | |
| 38976 | 14 | I1 | I2 | | I8 | 3D PC | 3D MESH | 20170602 194644 | PIZZA | SETH C | 6.25 | PRCHS | |
| 9822 | 142 | I1 | I2 | | I8 | 3D PC | 3D MESH | 20170602 194712 | SALAD | DAN N | 5.53 | PRCHS | |

(51) Int. Cl.
*G06K 9/78* (2006.01)
*G06N 20/00* (2019.01)
*G06Q 20/20* (2012.01)

(52) U.S. Cl.
CPC .............. *G06K 9/6289* (2013.01); *G06K 9/78* (2013.01); *G06N 20/00* (2019.01); *G06Q 20/201* (2013.01); *G06Q 20/208* (2013.01); *G06K 2209/17* (2013.01)

(56) References Cited

U.S. PATENT DOCUMENTS

| | | |
|---|---|---|
| 7,909,248 B1 | 3/2011 | Goncalves |
| 8,868,471 B1 | 10/2014 | Hullender |
| 9,009,096 B2* | 4/2015 | Pinckney .............. G06N 5/048 706/52 |
| 9,258,550 B1 | 2/2016 | Sieracki et al. |
| 9,327,406 B1 | 5/2016 | Hinterstoisser et al. |
| 9,454,732 B1* | 9/2016 | Garton .................. G06N 20/00 |
| 10,019,654 B1* | 7/2018 | Pisoni .................. G06K 9/6267 |
| 2004/0262391 A1* | 12/2004 | Harris .................... G06Q 20/20 235/454 |
| 2005/0052535 A1 | 3/2005 | Hamadi |
| 2005/0088529 A1 | 4/2005 | Geng |
| 2005/0163382 A1 | 7/2005 | Herley |
| 2005/0189411 A1* | 9/2005 | Ostrowski ............... A47F 9/045 235/383 |
| 2006/0043174 A1 | 3/2006 | Banavar et al. |
| 2006/0208169 A1 | 9/2006 | Breed et al. |
| 2008/0165195 A1* | 7/2008 | Rosenberg ............. G06T 13/40 345/473 |
| 2008/0252985 A1 | 10/2008 | Zhu et al. |
| 2009/0268967 A1 | 10/2009 | Simon et al. |
| 2010/0059589 A1 | 3/2010 | Goncalves et al. |
| 2010/0166294 A1 | 7/2010 | Marrion et al. |
| 2010/0217678 A1 | 8/2010 | Goncalves |
| 2010/0232681 A1 | 9/2010 | Fujieda et al. |
| 2012/0170805 A1* | 7/2012 | Brown ................ G06K 9/00778 382/103 |
| 2013/0010081 A1 | 1/2013 | Tenney et al. |
| 2013/0223673 A1 | 8/2013 | Davis et al. |
| 2013/0314541 A1 | 11/2013 | Lord et al. |
| 2014/0034731 A1 | 2/2014 | Gao et al. |
| 2014/0036630 A1 | 2/2014 | Herwig |
| 2014/0214568 A1* | 7/2014 | Argue .................... G07G 3/003 705/18 |
| 2015/0009214 A1* | 1/2015 | Lee .......................... G06T 17/10 345/420 |
| 2015/0023555 A1 | 1/2015 | Okamura et al. |
| 2015/0066201 A1 | 3/2015 | Wubbena et al. |
| 2015/0109451 A1* | 4/2015 | Dhankhar .......... G06Q 30/0641 348/150 |
| 2016/0063821 A1 | 3/2016 | Macintosh et al. |
| 2016/0110913 A1 | 4/2016 | Kosoy et al. |
| 2016/0150217 A1* | 5/2016 | Popov .................. H04N 13/271 348/48 |
| 2016/0196543 A1* | 7/2016 | Miyakoshi ........... G06Q 20/208 382/103 |
| 2016/0210682 A1* | 7/2016 | Kannan .............. G06Q 30/0261 |
| 2016/0269714 A1 | 9/2016 | Rhemann et al. |
| 2016/0358144 A1* | 12/2016 | Thrope ................ G06Q 20/204 |
| 2016/0364634 A1 | 12/2016 | Davis et al. |
| 2017/0054965 A1 | 2/2017 | Raab et al. |
| 2017/0164159 A1* | 6/2017 | Mycek .................... H04W 4/80 |
| 2017/0278308 A1 | 9/2017 | Bleiweiss et al. |
| 2017/0337682 A1 | 11/2017 | Liao et al. |
| 2018/0103209 A1 | 4/2018 | Fischler et al. |
| 2018/0120813 A1* | 5/2018 | Coffman ............ G05B 19/4097 |
| 2018/0211138 A1* | 7/2018 | Yamada ............... G06K 9/6256 |
| 2018/0239975 A1* | 8/2018 | Tamrakar ........... G06K 9/00845 |
| 2018/0268601 A1 | 9/2018 | Rad et al. |
| 2018/0300668 A1 | 10/2018 | Farley et al. |
| 2018/0314877 A1 | 11/2018 | Srivastava et al. |
| 2018/0349874 A1* | 12/2018 | You ...................... G06Q 20/202 |
| 2019/0065823 A1 | 2/2019 | Srivastava et al. |
| 2019/0073537 A1* | 3/2019 | Arilla ................. G06K 9/00684 |
| 2019/0095757 A1* | 3/2019 | Sugiura .............. G06K 9/00288 |
| 2019/0108561 A1* | 4/2019 | Shivashankar ........ G06Q 30/06 |
| 2019/0171975 A1* | 6/2019 | Kurian ..................... G06K 9/60 |

FOREIGN PATENT DOCUMENTS

| | | |
|---|---|---|
| JP | 2009042082 A | 2/2009 |
| JP | 2013186548 A | 9/2013 |
| WO | WO-2012128754 A1 | 9/2012 |
| WO | 2018200090 A1 | 11/2018 |

OTHER PUBLICATIONS

"U.S. Appl. No. 14/517,634, Final Office Action dated Jul. 21, 2016", 15 pgs.

"U.S. Appl. No. 14/517,634, Final Office Action dated Oct. 18, 2017", 15 pgs.

"U.S. Appl. No. 14/517,634, Non Final Office Action dated Jan. 5, 2016", 18 pgs.

"U.S. Appl. No. 14/517,634, Non Final Office Action dated Mar. 13, 2017", 17 pgs.

"U.S. Appl. No. 14/517,634, Non Final Office Action dated May 15, 2018", 16 pgs.

"U.S. Appl. No. 14/517,634, Response filed Jul. 5, 2016 to Non Final Office Action dated Jan. 5, 2016", 13 pgs.

"U.S. Appl. No. 14/517,634, Response filed Jul. 11, 2017 to Non Final Office Action dated Mar. 13, 2017", 13 pgs.

"U.S. Appl. No. 14/517,634, Response filed Oct. 21, 2016 to Final Office Action dated Jul. 21, 2016", 13 pgs.

"U.S. Appl. No. 14/517,634, Response filed Nov. 27, 2017 to Final Office Action dated Oct. 18, 2017", 14 pgs.

"U.S. Appl. No. 14/517,634, Response Filed Aug. 15, 2018 to Non Final Office Action dated May 15, 2018", 18 pgs.

"U.S. Appl. No. 15/497,730, Non Final Office Action dated Oct. 18, 2018", 20 pgs.

"European Application Serial No. 18161853.9, Extended European Search Report dated Sep. 19, 2018", 8 pgs.

"European Application Serial No. 18161854.7, Extended European Search Report dated Oct. 9, 2018", 8 pgs.

"European Application Serial No. 18161856.2, Partial European search report dated Oct. 22, 2018", 14 pgs.

"International Application Serial No. PCT/US2018/022612, International Search Report dated Jun. 8, 2018", 2 pgs.

"International Application Serial No. PCT/US2018/022612, Written Opinion dated Jun. 8, 2018", 5 pgs.

"International Application Serial No. PCT/US2018/022644, International Search Report dated Jun. 7, 2018", 2 pgs.

"International Application Serial No. PCT/US2018/022644, Written Opinion dated Jun. 7, 2018", 5 pgs.

"International Application Serial No. PCT/US2018/023132, International Search Report dated Jun. 8, 2018", 2 pgs.

"International Application Serial No. PCT/US2018/023132, Written Opinion dated Jun. 8, 2018", 6 pgs.

* cited by examiner

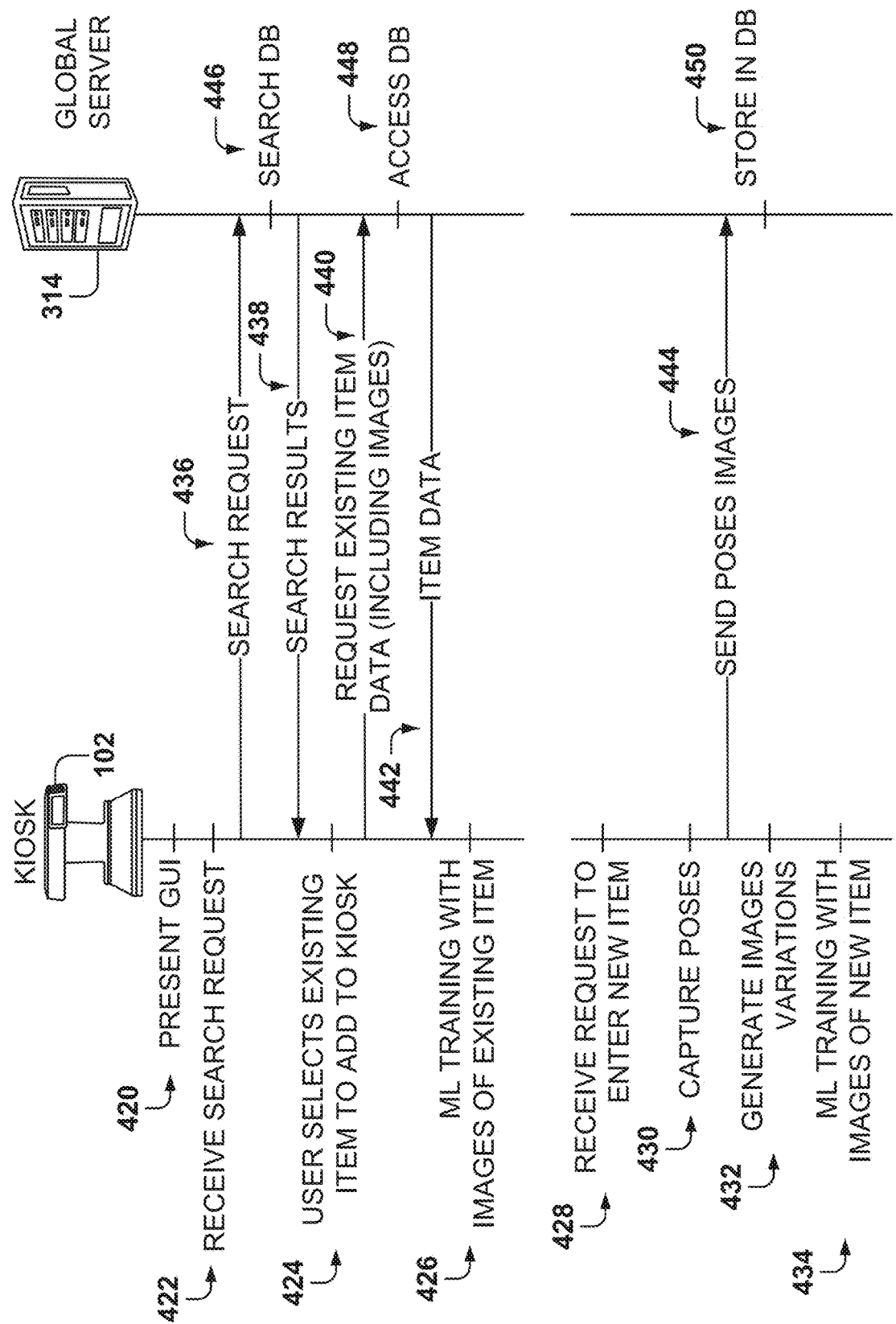

TRANSACTION TABLE

702

| ID | TIME | ITEM(S) | TOTAL | CARDHOLDER | NOTES |
|---|---|---|---|---|---|
| 24-10519 | 18:36:59 | G&G ITALIAN SANDWICH | $6.52 | JOHN SMITH | PURCHASE |
| 23-5473 | 18:36:22 | SUNCHIPS | $2.06 | ANNA ADAMS | REFUND |
| 24-10516 | 18:35:45 | DIET COKE | $1.59 | BILL LOPEZ | MARK AS TEST |
| 24-10515 | 18:35:25 | PURE LEAF TEA 18.5 OZ. | $2.67 | GILL CHU | PURCHASE |
| 23-5472 | 18:35:01 | KIND BAR<br>DIET COKE 20 OZ<br>BAZZINI NUTS | $8.45 | GI JOE | PURCHASE | ooo

FIG. 7

TRANSACTIONS DATABASE

| TRAN ID | KIOSK | IMG 1 | IMG 2 | ... | IMG 8 | 3D POINT CLOUD | 3D MESH | DATE TIME | ITEM | PAYER | AMNT | NOTES | ... |
|---|---|---|---|---|---|---|---|---|---|---|---|---|---|
| 1578 | 47 | I1 | I2 | | I8 | 3D PC | 3D MESH | 20170602 194512 | COKE | JOE S | 2.49 | PRCHS | |
| 1579 | 47 | I1 | I2 | | I8 | 3D PC | 3D MESH | 20170602 194628 | APPLE | CARL S | 0.99 | REFND | |
| 38976 | 14 | I1 | I2 | | I8 | 3D PC | 3D MESH | 20170602 194644 | PIZZA | SETH C | 6.25 | PRCHS | |
| 9822 | 142 | I1 | I2 | | I8 | 3D PC | 3D MESH | 20170602 194712 | SALAD | DAN N | 5.53 | PRCHS | |

GENERATION OF TWO-DIMENSIONAL AND THREE-DIMENSIONAL IMAGES OF ITEMS FOR VISUAL RECOGNITION IN CHECKOUT APPARATUS

CLAIM OF PRIORITY

This application is a Continuation application under 35 USC § 120 of U.S. patent application Ser. No. 15/883,355, entitled "Feedback Loop for Image-Based Recognition," filed on Jan. 30, 2018, and is herein incorporated by reference in its entirety.

RELATED PATENT APPLICATIONS

This application is related to U.S. patent application Ser. No. 15/497,730, filed Apr. 26, 2017, and entitled "Synchronization of Image Data from Multiple Three-Dimensional Cameras for Image Recognition"; and U.S. patent application Ser. No. 15/685,455, filed on Aug. 24, 2017, and entitled "Separation of Objects in Images from Three-Dimensional Cameras," which are incorporated herein by reference in their entirety.

TECHNICAL FIELD

The subject matter disclosed herein generally relates to methods, systems, and programs for visual recognition of objects.

BACKGROUND

Visually recognizing objects is one of those tasks that is very simple for humans but very difficult for machines. Some solutions for visual recognition require that the object be in a very specific position, limit the number of objects that may be recognized, or require that a distinctive mark be placed on the object, such as multi-line barcodes or matrix barcodes.

But these solutions do not solve the general problem of quick recognition of any object from a large number of possible objects in an uncontrolled environment where the objects may be situated in any position, such as objects placed on a checkout counter.

Machine-learning programs are being used for object recognition, but these programs require a large number of sample images (e.g., thousands of images) to be trained for object recognition. Adding a new object for classification may become a cumbersome, lengthy operation.

BRIEF DESCRIPTION OF THE DRAWINGS

Various ones of the appended drawings merely illustrate example embodiments of the present disclosure and cannot be considered as limiting its scope.

FIG. 4B is a swim-lanes diagram of a method for training the new kiosk, according to some example embodiments.

FIG. 7 is a transaction table for presenting transaction data, according to some example embodiments.

FIG. 11 illustrates the data stored in a transactions database, according to some example embodiments.

DETAILED DESCRIPTION

Figure 1:
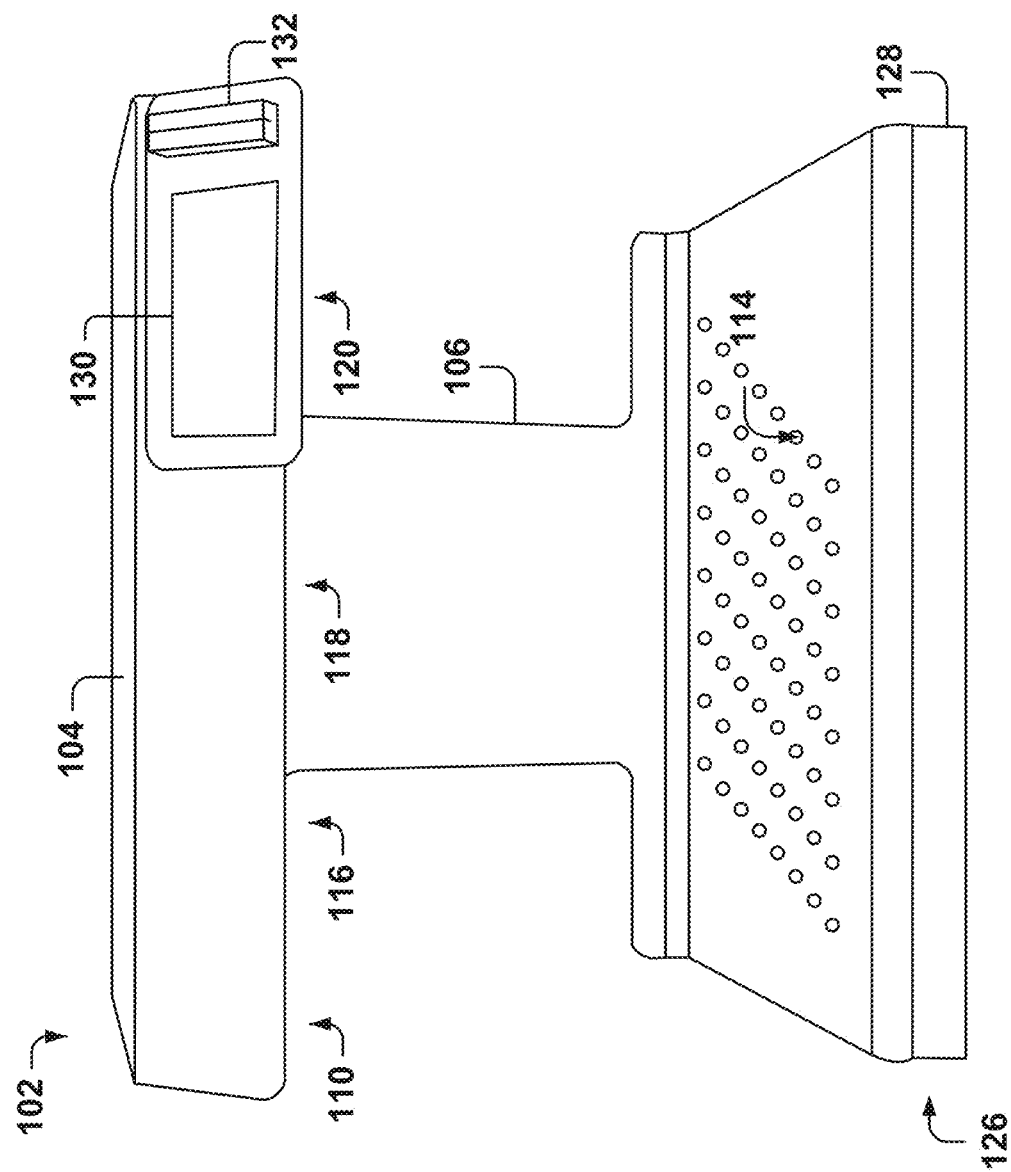
FIG. 1 illustrates an object recognition system, according to one example embodiment.

Example methods, systems, and computer programs are directed to providing a feedback loop to improve object image-based recognition based on transaction data. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A checkout system, also referred to herein as a kiosk or a terminal, includes a plurality of three-dimensional (3D) cameras that take 3D images of objects placed in an examination space defined in the checkout system. A machine-learning algorithm is utilized to identify the objects placed in the checkout system. However, for good accuracy, the machine-learning algorithm is trained with thousands of sample images of an object to be able to classify the object. Taking thousands of sample images is an arduous task, so some images are taken of the object (e.g., 50 different poses of the object) and then additional images are created by manipulating the captured images, such as by changing brightness, cropping, darkening, rotating, etc.

Once the kiosk is operating, transactions at the kiosk include taking images of the objects with the plurality of 3D cameras for object recognition. These transactional images are sent to a central global database that stores the transaction images for a plurality of kiosks in operation. Over time, the number of images for any given object grows in the central database. The kiosks are able to download the additional images for the objects that are classifiable, resulting in thousands of images of the object. The machine-learning program at the kiosk is then retrained periodically with the additional images, and since the number of images has grown substantially, the machine-learning program keeps improving accuracy.

In addition, the global database may be utilized to activate new kiosks. Once the classifiable objects are defined for the new kiosk, images are downloaded from the global database to simplify the machine-learning program training. For items not present in the global database, a training process takes place at the kiosk to capture different poses of the new item. The captured images for the new item are sent to the global database to continue growing the number of available inventory items.

Therefore, the use of a central repository in the global database provides a feedback loop based on operation of the kiosks to improve the accuracy of the items recognition. Additionally, convenience is greatly improved because no manual process needs to be performed at the kiosk for objects that are already inventoried in the global database.

In one embodiment, a method is provided. The method includes an operation for providing a user interface for selecting items to be visually recognized by a first terminal. The user interface provides options to select the items from a database coupled to a server or to select new items that are not in the database. The database comprises a plurality of items and image information that has been captured during transactions performed at the first terminal and at other terminals. The method further includes an operation for receiving a selection of a first item to be visually recognized. When the first item is present in the database, a request is sent to the server for the image information of the first item from the database and the image information is received from the server. When the first item is not present in the database of items, a plurality of pose images are captured, by a plurality of cameras at the first terminal, for a plurality of poses of the first item, where each camera takes a pose image for each pose of the first item. The method further includes an operation for training a machine-learning program based on the received image information or the plurality of pose images captured at the first terminal. The machine-learning program performs image-based recognition of the selected items to be visually recognized by the first terminal based on images captured by the plurality of cameras.

In another embodiment, a terminal includes a display, a plurality of cameras for taking images of items placed in an examination space of the terminal, a memory and one or more computer processors. The memory comprises instructions and a machine-learning program for performing image-based recognition of items in the examination space based on the images taken by the plurality of cameras. The instructions, when executed by the one or more computer processors, cause the one or more computer processors to perform operations comprising: providing a user interface on the display for selecting items to be visually recognized by the terminal, the user interface providing options to select the items from a database coupled to a server or to select new items that are not in the database, the database comprising a plurality of items and image information that has been captured during transactions performed at the terminal and at other terminals; receiving a selection of a first item to be visually recognized; when the first item is present in the database, sending a request to the server for the image information of the first item from the database and receiving the image information from the server; when the first item is not present in the database of items, capturing, by the plurality of cameras, a plurality of pose images for a plurality of poses of the first item when placed in the examination space, wherein each camera takes a pose image for each pose of the first item; and training the machine-learning program based on the received image information or based on the plurality of pose images captured at the terminal.

In yet another embodiment, a non-transitory machine-readable storage medium includes instructions that, when executed by a machine, cause the machine to perform operations comprising: providing a user interface for selecting items to be visually recognized by a first terminal, the user interface providing options to select the items from a database coupled to a server or to select new items that are not in the database, the database comprising a plurality of items and image information that has been captured during transactions performed at the first terminal and at other terminals; receiving a selection of a first item to be visually recognized: when the first item is present in the database, sending a request to the server for the image information of the first item from the database and receiving the image information from the server; when the first item is not present in the database of items, capturing, by a plurality of cameras at the first terminal, a plurality of pose images for a plurality of poses of the first item, wherein each camera takes a pose image for each pose of the first item; and training a machine-learning program based on the received image information or the plurality of pose images captured at the first terminal, wherein the machine-learning program performs image-based recognition of the selected items to be visually recognized by the first terminal based on images captured by the plurality of cameras.

FIG. 1 illustrates an object recognition system 102, according to one example embodiment. Some embodiments are disclosed in the context of automated object recognition for a checkout system, referred to herein as a kiosk, e.g., in a cafeteria or a grocery counter, but the principles for object recognition may be utilized in other scenarios that may benefit from visually recognizing objects. Examples of such scenarios may include, but are not limited to, self-checkout of products by customers in supermarkets, restaurants, or coffee shops; multi-product packaging of diverse products in a packaging plant; product quality control in a manufacturing plant; advanced driver assistance systems such as automatic parking systems; public surveillance systems; and automated teller machines (ATMs).

The object recognition system 102 may include a base 128, a post section 106 on one side of the base 128, and a top section 104 above the post section 106. The base 128 is used for supporting objects during the object recognition operations, and a scale 126 in the base 128 may be used for weighing items.

A plurality of 3D cameras (e.g., 116, 118, and 120) are positioned on the bottom surface of the top section 104. In some example embodiments, the 3D cameras may be of different types, and although they may be situated near each other, they may provide different visual information based on the 3D technology utilized. In some example embodiments, the number of cameras is in the range from 2 to 10 cameras or more.

A display 130 is used to present user interfaces, such as user interfaces for configuring the object recognition system 102 or for presenting messages to users at the checkout counter. In some example embodiments, the display 130 includes a touchscreen.

The object recognition system 102 further includes a card reader 132 for receiving credit card information. Although a stripe card reader is illustrated, the card reader 132 may also collect credit card information in other ways, such as a credit card chip reader or an interface to obtain payment information from a smart phone.

An illumination device 110 (e.g., compact fluorescent tubes, bulbs, light-emitting diodes, etc.) on the top section 104 may be configured to substantially illuminate the objects for recognition. A calibration pattern 114 defined on the top surface of the base 128 is utilized for calibrating the cameras used for object recognition. The calibration pattern 114 may include various colors such as red, green, blue, white, black, and other shades or combinations, and the calibration pattern 114 may be in any shape such as squares, color wheels, or any other kind of shape.

It is to be noted that the embodiments illustrated in FIG. 1 are examples and do not describe every possible embodiment. Other embodiments may have different shapes, place cameras in different positions, place illumination sources in different positions, and so forth. The embodiments illustrated in FIG. 1 should therefore not be interpreted to be exclusive or limiting, but rather illustrative.

Figure 2:
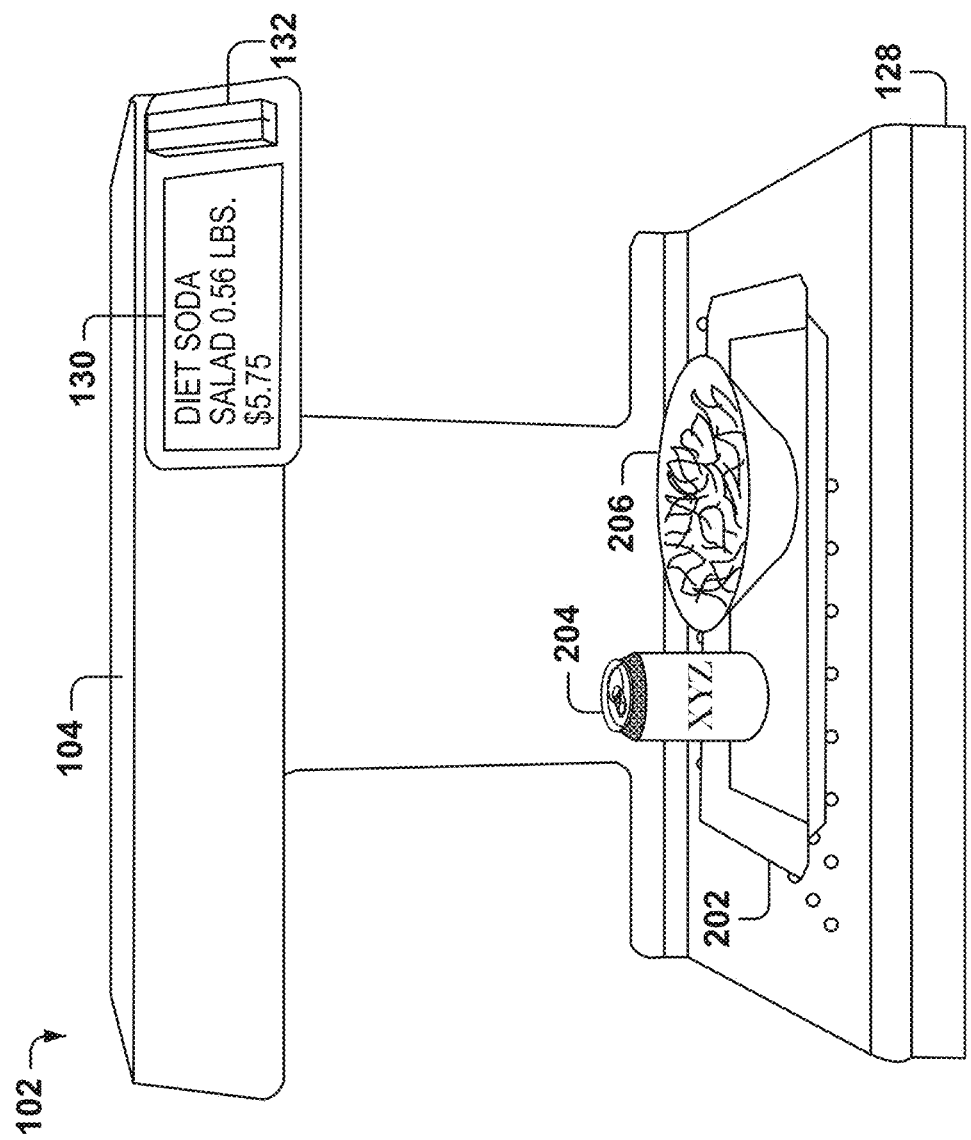
FIG. 2 illustrates the operation of the checkout system, according to some example embodiments.

FIG. 2 illustrates the placement of objects for recognition, according to some example embodiments. During object recognition, objects such as an illustrated tray 202, soda can 204, and salad 206 are placed on the base 128, and the object recognition system 102 takes 3D images of the objects on the base 128.

More than one object at a time may be recognized, and if more than one object is present, the object recognition system 102 creates separate 3D models for each of the objects before they are submitted to an object recognition program. Further, the objects do not have to be placed on a predetermined location of the base 128, with a predetermined orientation (e.g., standing on the side or standing on the base), or with a bar code aiming in a certain direction. The system does not rely on barcodes to recognize the objects, but rather the system analyzes the shape, color, and dimensions of the object to determine its identity, although if a barcode is detected, the barcode may also be used for recognition. In other words, since the barcode is part of the appearance of the object, the barcode is used for object recognition as part of the overall appearance of the object. However, object recognition does not rely on identifying the barcode and then searching a database that maps the found barcode to a known categorized object.

It is to be noted that some objects may be easier to recognize, such as the soda can 204, because they only have one type of packaging or appearance. However, other items, such as the salad 206, may have many variations. For example, salads may have different color combinations, different volumes, different arrangements of components, etc. Therefore, recognizing a salad may require thousands of salad images that account for different presentations of the salad, including color variations, different lighting conditions, different volume, different ingredients, etc.

Figure 3:
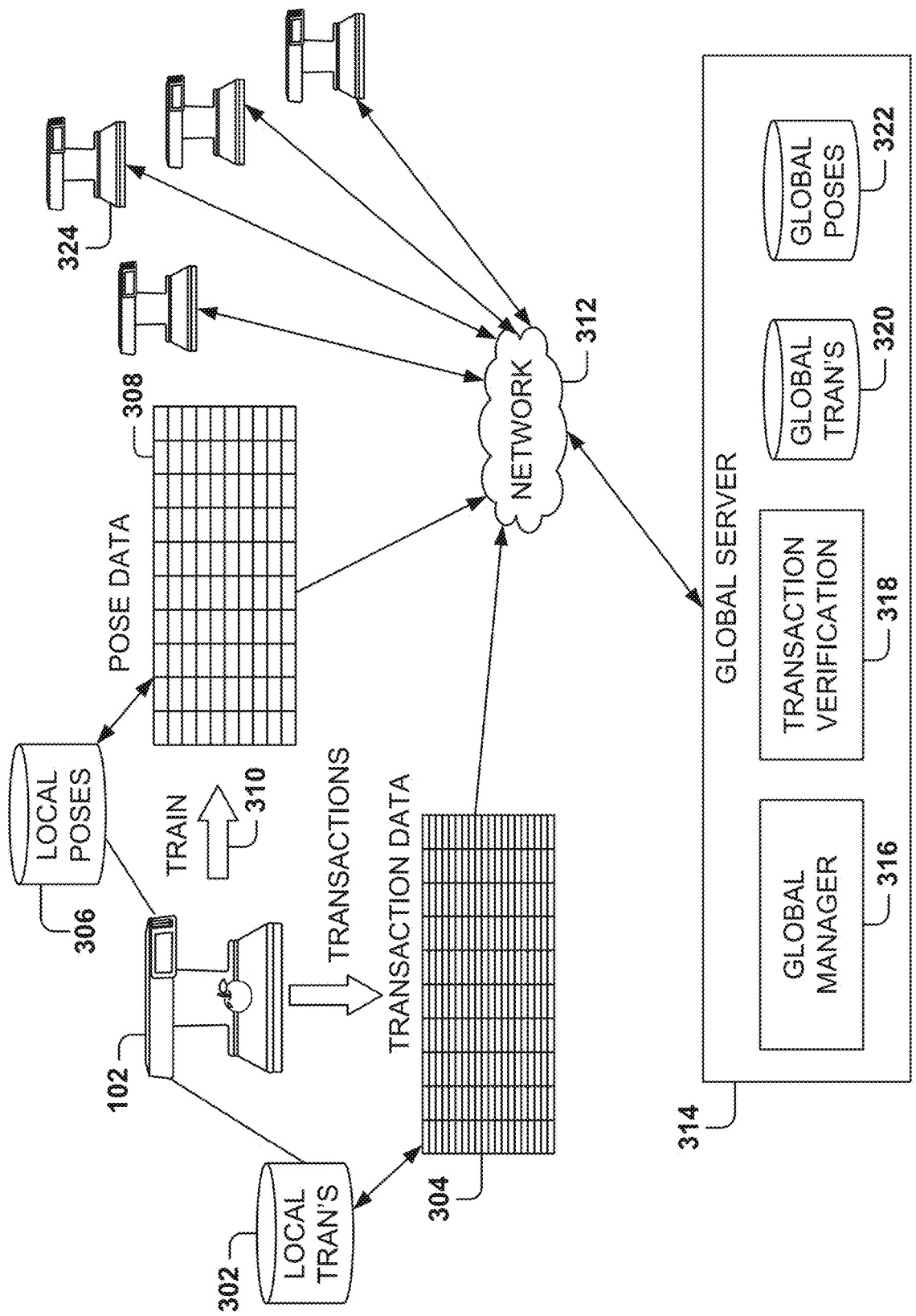
FIG. 3 illustrates a process for collecting image-related data by a global server, according to some example embodiments.

FIG. 3 illustrates a process for collecting image-related data by a global server, according to some example embodiments. A machine-learning program is utilized to identify the objects placed in the kiosk 102. For good accuracy, the machine-learning program is trained with thousands of sample images of an object to be able to classify the object. Taking thousands of sample images is an arduous task, so some images are taken of the object (e.g., 50 different poses of the object) for training 310 and additional images are created by manipulating the captured images, such as by changing brightness, cropping, darkening, rotating, etc. It is to be noted that each pose includes an image from each of the 3D cameras, such that if there are eight 3D cameras, at least eight images will be saved. The data for each pose is saved in a local pose database 306 that holds pose data 308.

Once the kiosk, also referred to herein as the object recognition system, is operating, transactions at the kiosk include taking images of the objects with the plurality of 3D cameras for object recognition. These transactional images are kept in a local transactions database 302 including transaction data 304. Transaction data is the data obtained when people are actually using the system, e.g., when the kiosk is in operation. Because each user may place the item in a different position and at a different time, a large number of variations are gathered for each of the items. For example, a great deal of information is captured for different plate items, such as salads, pasta dishes, fruit, pizza, etc.

The pose data 308 and the transaction data 304 are transmitted to a global server 314 via a network 312 connection. Thus, the global server 314 acts as a central repository for all the transaction and pose data from all the kiosks 102, 324 in operation. In one example embodiment, the pose data 308 includes all or part of the same data as the transaction data 304, which is described with more detail below with reference to FIG. 11.

The global server 314 includes a global manager 316, a transaction verification module 318, a global transaction database 320, and a global pose database 322. In some example embodiments, the global transaction database 320 and the global pose database 322 are combined into a single database. Further, although the global server 314 is illustrated as a single server, other implementations may include distributed servers that cooperate for performing the functions of the global server 314, and distributed databases for performing the functions of the global transaction database 320 and the global pose database 322.

Over time, the number of images for any given object grows in the central database (e.g., several thousand images for each object), and the kiosks are able to download the additional images for the objects that are classifiable, resulting over time in thousands of available images for the object. The machine-learning program at the kiosk is then retrained periodically with the additional images, and since the number of images has grown substantially, the machine-learning program keeps improving accuracy as better training data is available.

Initially, only one item is recorded at one kiosk and the data is used to train for that item in that machine. Over time, additional data is captured for the same object in many different kiosks (transactional or pose data), resulting in higher image variety because each kiosk has different cameras, different lighting conditions, etc. Further, there may be different types of shadows created on an object because of the presence of other objects in the examination space.

It is to be noted that, although cameras may have the same make and model, each camera may have slight variations, which results in image data with slight variations. Thus, collecting data from many different kiosks greatly improves the diversity of images captured for each object. Additionally, different kiosks may have different types of cameras, so the variety of images also improves because of the variation introduced by different types of cameras.

The global manager 316 provides a user interface for managing the operation of the kiosks, and coordinates operations with the kiosks, such as the transmission of object data in both directions. Transaction data is uploaded to the global server 314 from the kiosks, and the transaction data from many kiosks may be downloaded from the global server 314 to perform object recognition.

In some example embodiments, each kiosk 102 coordinates the download of information from the global server 314, such that the data already available in the kiosk is not retransmitted in order to save network bandwidth and computing resources.

The transaction verification module 318 performs validation of the transaction data. Sometimes, objects are not recognized properly at the kiosk, and the transaction verification module 318 provides a way to make corrections. In some example embodiments, the transaction data downloaded from the kiosks is presented to a human judge, who then validates the transactions when the objects are recognized properly, or identifies mistakes when the transactions are not recognized properly. When a mistake is found, the human judge may correct the record to reflect the correct object.

In some example embodiments, the judgment from the human judge is saved in the global transaction database 320, e.g., a 1 for a correct detection and a 0 for an incorrect detection. Further, if an error is corrected, the value may be changed from 0 to 1, or another code (e.g., 2) may be used to identify a correction.

It is to be noted that the embodiments illustrated in FIG. 3 are examples and do not describe every possible embodiment. Other embodiments may utilize different modules, a distributed server architecture, a distributed database architecture, etc. The embodiments illustrated in FIG. 3 should therefore not be interpreted to be exclusive or limiting, but rather illustrative.

Figure 4A:
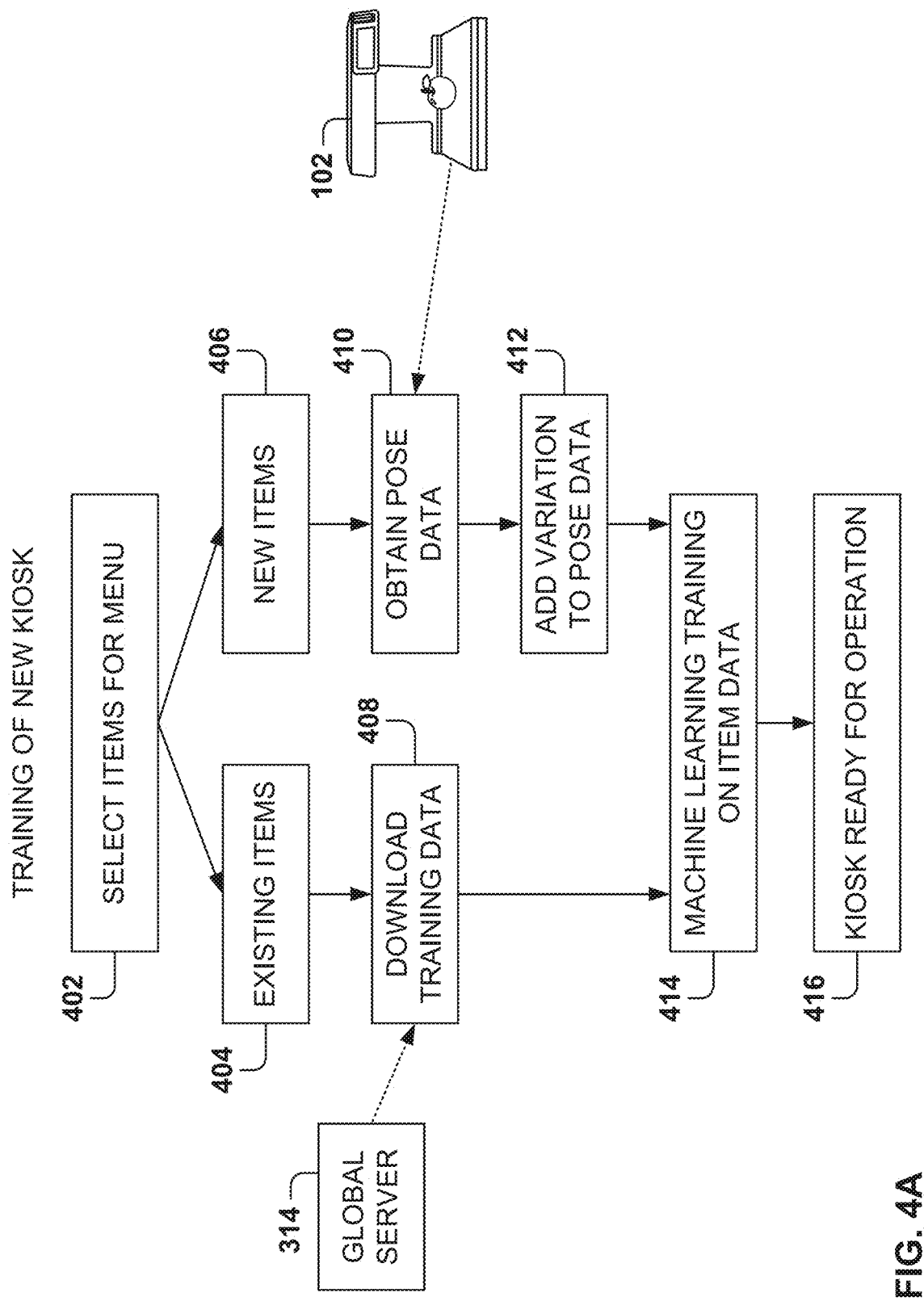
FIG. 4A is a flowchart of a method for training a new kiosk to prepare for object recognition, according to some example embodiments.

FIG. 4A is a flowchart of a method for training a new kiosk to prepare for image-based recognition, according to some example embodiments. Because the global database holds a large amount of data, it is much easier to start a new kiosk with the images already recorded in the global database. Over time, the global database keeps adding more items to the menu, so it is easier and faster to add new kiosks in new locations.

The training of the new kiosk starts at operation 402, where the user is provided a user interface for selecting which items will be in the menu of recognizable items. In some example embodiments, a prerecorded configuration of items may be loaded into the kiosk 102 and the user does not have to manually enter each item.

The items at the kiosk may be existing items 404 or new items 406. The existing items 404 are those items that are already recorded in the global database. For existing items 404, at operation 408, the training data for those items is downloaded from the global server 314. Therefore, no recording of poses is required for these items. In general, kiosks belonging to the same company tend to use the same items in the menu, so it is easier to initialize those kiosks. There may be some variation because of the addition of local items, but those items tend to be a very small percentage of the total number of recognizable items.

There may be 40,000 images of salads, as people make all kinds of salads, and all that information is recorded to improve image-based recognition. In fact, there could be two kinds of salads, and image-based recognition would be able to differentiate between the two types of salads.

For new items 406, at operation 410, pose data is obtained at the kiosk 102. For example, 50 different poses are recorded at the kiosk. In addition to the images taken, the training set is augmented by creating variations of the captured images at operation 412. For example, variations may be created by adding shadows, changing brightness, adding a partial block to the image, adding artificial shine, adding artificial lines, changing colors slightly, etc. This way, it is possible to go from 50 images to thousands of images, which enables adequate training of the machine-learning program for object recognition.

For example, there is a new kiosk to be installed, and the kiosk is initially configured to recognize salads and a soda can. Data for salads is available in the global server 314, but the soda can is a new item 406 and there is no data for it. The kiosk is connected to the network and the data for the salad is downloaded from the global server 314. On the other hand, the data for the soda can is generated by capturing images of the soda can. In this case, pose data has to be captured for just one object instead of two.

Later, another kiosk is to be installed that is able to recognize salads, the soda can, and pizza boxes that are already in the global database. Now, the three items are already in the global database. Therefore, to prepare this kiosk for operation, all the data may be downloaded from the global server 314, thus avoiding the need to generate the pose images.

At operation 414, the machine-learning program is trained with the data for the selected items, which has been either downloaded from the global server 314 or obtained via image capture of object poses. In machine learning, object recognition accuracy depends on the number of images available for training. Further, the more diverse the conditions for the captured images, the better the images are for recognition accuracy. Therefore, having image data with different types of lightning, positions, reflections, shadows, etc. helps improve accuracy. In general, thousands of images are desired to obtain a good accuracy level for image-based recognition.

Diversity is especially important for items without a fixed look, such as salads, pasta dishes, sushi, fruit, etc. On the other hand, manufactured items that have consistent packaging may not need as much variation because their look is consistent. Two salads will not look the same, but a soda can will always look the same. This is why image variety is important, and having thousands of sample images is best for accuracy.

After the machine-learning program in the kiosk has been trained, at operation 416, the kiosk is ready for operation. New locations may be launched very quickly because it is not necessary to record all the items again. As the database grows, the number of items that need to be recorded will be less and less.

FIG. 4B is a swim-lanes diagram of a method for training the new kiosk, according to some example embodiments. At operation 420, the GUI is presented at the kiosk 102. More details are provided below for the GUI with reference to FIGS. 5A-5B and 6-9.

At operation 422, a search request is received in the GUI. For example, the user may do a search for an apple to add the apple to the menu. The kiosk 102 sends the search request 436 to the global server 314. In other example embodiments, the kiosk may store a copy of the database, or part of the database, and the search request may be performed at the kiosk 102.

At operation 446, the global server 314 searches the database according to the search request 436. The global server 314 sends the search results 438 to the kiosk 102. The kiosk 102 presents the search results 438 to the user, and at operation 424, a user selection is received for adding an existing item in the database to the kiosk, such that the added item may be visually recognized during operation of the kiosk.

At operation 440, the kiosk 102 sends a request 440 the global server 314, the request being for item data for the new item, where the item data includes item images and other metadata for the item (e.g., geographic model, item description, price, etc.).

At operation 448, the global server 314 accesses 448 the database to retrieve the item data, and at operation 442, the item data is transmitted to the kiosk 102.

Once the item data is received at the kiosk 102, including the item images, the machine-learning program is trained with the received images for performing image recognition.

In some example embodiments, the kiosk 102 receives 426 a request to enter a new item. The GUI then guides the user through a process to capture images of the item so the images may be used for the training of the machine-learning program. At operation 430, the cameras at the kiosk 102 capture different poses of the new item. Optionally, the captured pose images are sent 444 to the global server 314 for storage 450 in the global database.

At operation 432, the kiosk 102 generates image variations of the captured pose images to increase the number of available images for the item. At operation 434, the machine-learning program is trained with the images of the new item, including the pose images and the variations. The machine-learning program is trained with images, and other data, for all the items to be visually recognized by the kiosk 102.

Figure SA is a screenshot of a user interface 502 for the main menu of the checkout stand, according to some example embodiments. The user interface 502 is presented on the display 130 and provides several options to the user. The options include getting help, accessing control settings, proceeding to checkout mode, training items, performing a weight scale test, obtaining kiosk info (e.g., identification, installation date, transaction summaries, transaction data, etc.), and performing a camera calibration operation.

When the operator of the kiosk wishes to add a new item to the menu, the "train other items" option may be selected. The kiosk will guide the user through one or more user-interface screens to configure the new item, which may be downloaded from the global database or recorded at the kiosk.

Figure 5A:
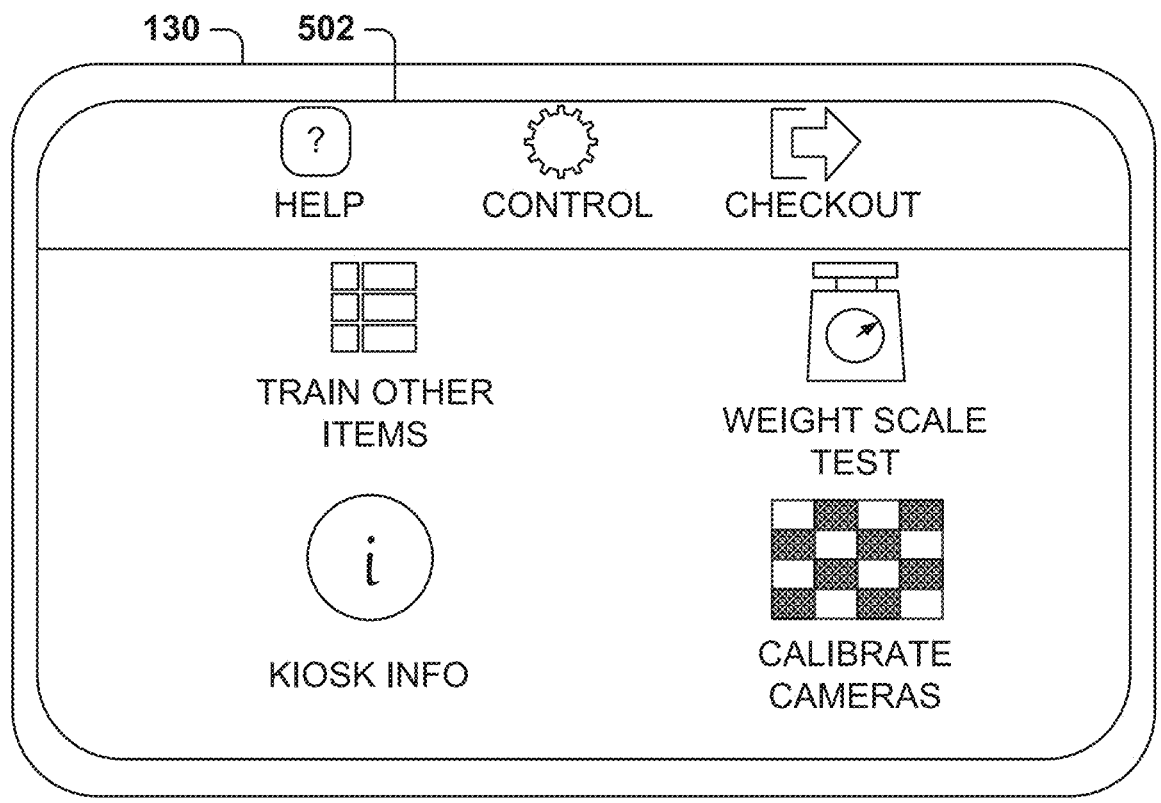
FIG. 5A is a screenshot of a user interface for the main menu of the checkout stand, according to some example embodiments.
Figure 5B:
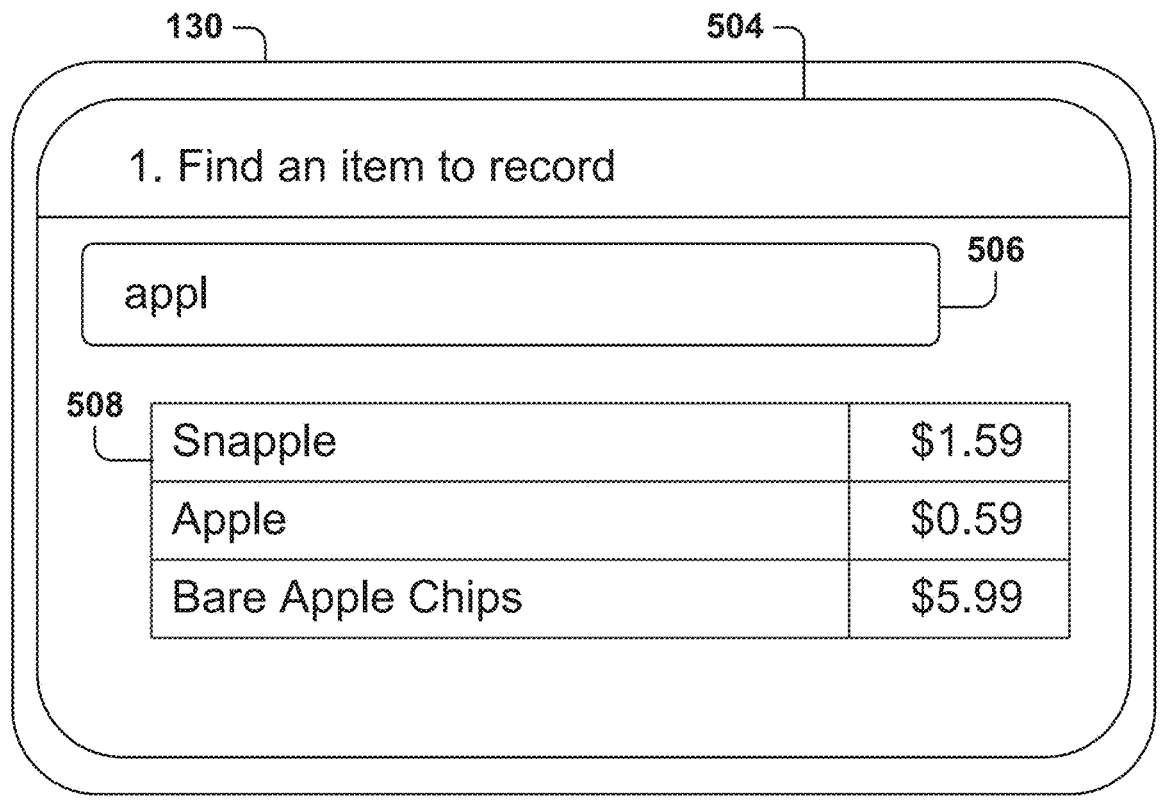
FIG. 5B is a screenshot of a user interface for finding an item to configure, according to some example embodiments.

FIG. 5B is a screenshot of a user interface 504 for finding an item to configure, according to some example embodiments. The user interface 504 is presented on the display 130 and provides a search option for adding the new item. A search box 506 allows the user to enter a search query. Results 508 are presented below.

The user may then select one of the existing items or select to train a new item. If the user selects an existing item, the user may configure the item (e.g., accept the suggested price or enter a new price) and then add it to the menu.

Figure 6:
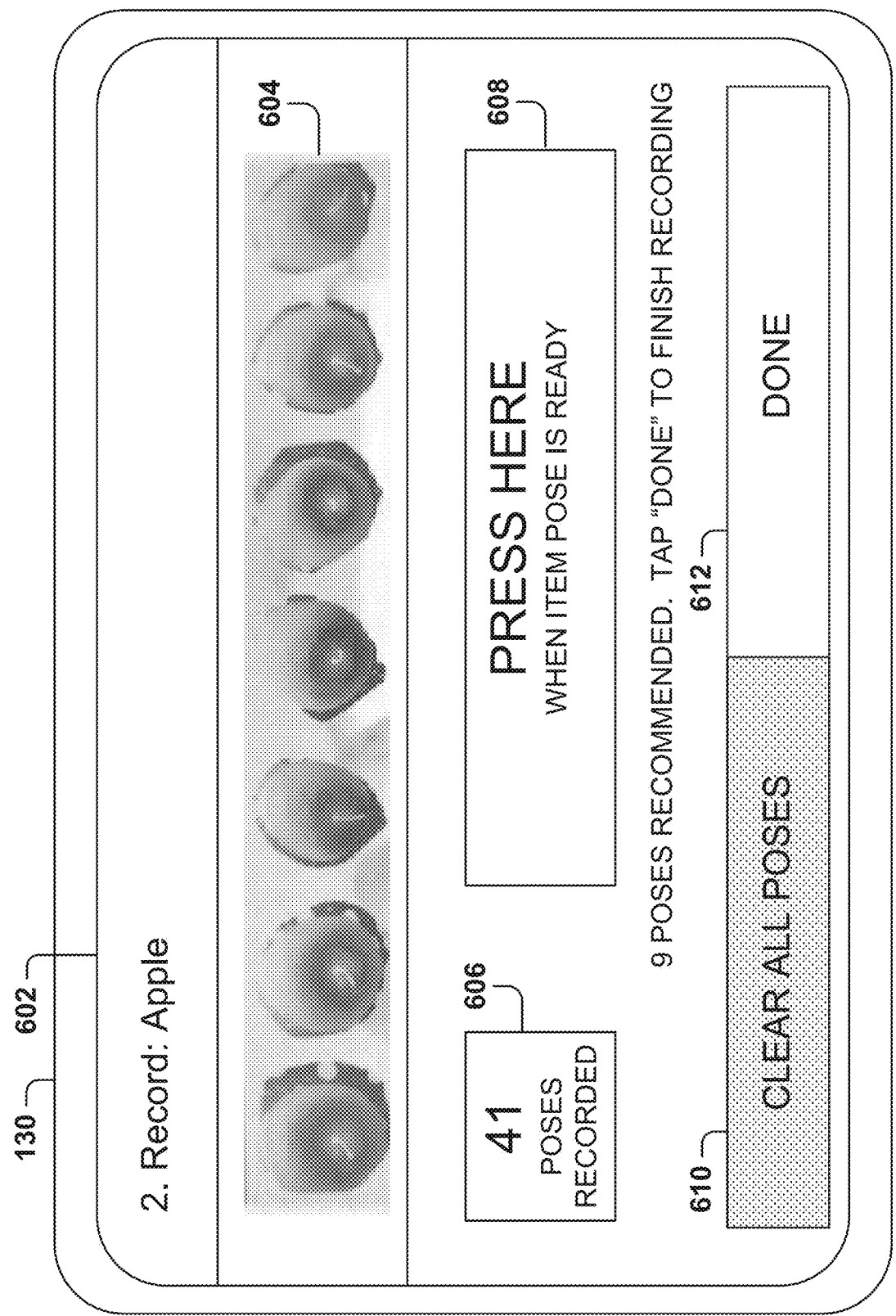
FIG. 6 is a screenshot of a user interface for collecting poses of an object, according to some example embodiments.

FIG. 6 is a screenshot of a user interface 602 for collecting poses of an object, according to some example embodiments. The user interface 602 illustrates the recording of poses for a new item, an apple. The kiosk guides the user through the process and asks the user to place the item in the examination space. An option 608 prompts the user, "Press here when item pose is ready." After the user places the item, this option 608 may be selected, and images will be captured of the item. In this example, the goal is to record 50 different poses, and a message below the option 608 advises the user that 9 more poses are recommended, and to select a "Done" option 612 after recording of the poses.

A message 606 indicates that 41 poses have already been recorded, and an image section 604 illustrates some of the recently captured images of the item. Further, an option 610 is available for the user to "clear all poses" in order to reset the process of capturing images and be able to start over or cancel.

The captured images are recorded in the local database of the kiosk. When the network connection is available, the captured images may also be transmitted to the global server.

When the process of capturing images is completed, an option is presented to the user to begin the machine-learning-program training based on the newly acquired images. As discussed earlier, before training takes place, the set of available images is grown by creating additional derived images, such as by creating random brightness changes, creating random shines, creating random shadows, adding noise, cropping portions of the images, etc. This way, thousands of images may be available for the training.

After the training, the kiosk is ready to start recognizing the apple, and also to separate the apple from other items placed in the examination space simultaneously.

FIG. 7 is a transaction table 702 for presenting transaction data, according to some example embodiments. The transaction data may be presented on a user interface of the kiosk or on a user interface provided by the global server to examine transactions from all, or part, of the kiosks.

In some example embodiments, the transaction table 702 includes an entry for each transaction, and for each entry the following fields are available: transaction identifier, time of the transaction (may also include the date), item or items recognized for the transaction, total amount of the transaction, cardholder if available (or name of the person conducting the transaction), and notes.

The transaction identifier (e.g., 24-10519) is a unique field for each transaction that uniquely defines the transaction among all the transactions. The time (e.g., 18:36:59) identifies the time and may also identify the date of the transaction, depending on table formatting options. The item (or items) field provides a text description of the items in the transaction. In other example embodiments, each item may also have its own item identifier, and the item identifiers of the transaction may be displayed in a separate field.

The cardholder field (e.g., John Smith) identifies the person who used a credit card to pay for the transaction. To speed processing at the kiosk, sometimes the only options for payment include paying by credit card, paying with some other company card, or paying with a smart phone connected to a credit card or a financial institution account (e.g., bank account). However, other embodiments may allow for cash payments that may be collected by a cashier or a machine accepting cash.

It is to be noted that the embodiments illustrated in FIG. 7 are examples and do not describe every possible embodiment. Other embodiments may utilize different fields or additional fields, combine fields, etc. The embodiments illustrated in FIG. 7 should therefore not be interpreted to be exclusive or limiting, but rather illustrative.

Figure 8:
FIG. 8 is a screenshot of a user interface illustrating the capture of poses for a salad, according to some example embodiments.

FIG. 8 is a screenshot of a user interface 802 illustrating the capture of poses for a salad, according to some example embodiments. The user interface 802 is provided by the global server to access kiosk-related data. Multiple options are provided, as illustrated on the top of the user interface 802, such as "Poses," "Transactions," "Database viewer," and "Recognition Report."

In the illustrated embodiment, the "Poses" option has been selected. On the left side, a list of items is presented that are selectable by the user. In the illustrated example, the user has selected the option for small salad. On the right, a variety of salad poses 804-808 are presented with a sample of captured images for the salads.

As illustrated, it can be observed that the salads may vary greatly in their appearance, based on how the customer builds the salad. In addition, the coloring may also vary based on the ingredients added to the salads. For example, some salads may include lettuce, broccoli, etc., and may appear mostly green, while other salads may include tomatoes, watermelon, etc., and appear mainly red. Other salads may include combinations resulting in mixed coloring.

There may be a large number of different types of dishes, such as salads, different country specialties, etc. However, over time, the database of items keeps growing and growing, and it may not be necessary to keep recording the salads, because there is a large amount of transaction data for many dishes. This means that adding new items to the menu, or initializing a new kiosk, will be quick and easy. Having the transaction database provides convenience for the kiosk administrator.

Figure 9:
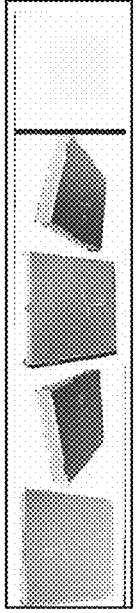
FIG. 9 is a screenshot of a user interface illustrating the capture of poses for a pizza box, according to some example embodiments.

FIG. 9 is a screenshot of a user interface 902 illustrating the capture of poses for a pizza box, according to some example embodiments. The user interface 902 shows a plurality of captured images 904-908 for pizza boxes.

Another important convenience feature is the ability to update multiple kiosks when an item changes packaging. For example, the look of a soda can or the writing on a pizza box may change. To adjust for the new packaging, the new packaging may be recorded with a plurality of poses in just one or more locations. Then, the images of the new packaging may be propagated to all the kiosks, without having to record the new packaging in every kiosk. In addition, the machine-learning program may be configured to map two different packages to the same menu item, to accommodate the transition. For example, if a bottle of water changes packaging, some locations may still have the old packaging while other locations may have the new packaging. By allowing the two packaging designs in the system simultaneously, the kiosk may process the old packaging until it is no longer available.

Figure 10:
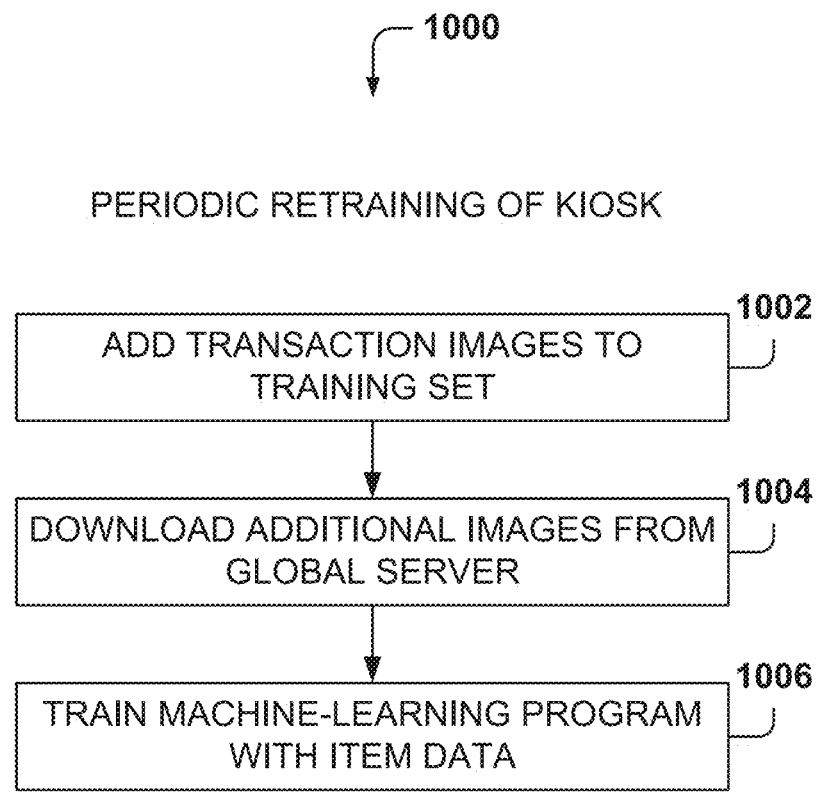
FIG. 10 is a flowchart of a method for periodic retraining of a kiosk, according to some example embodiments.

FIG. 10 is a flowchart of a method 1000 for periodic retraining of the kiosk, according to some example embodiments. Over time, more transaction data is available, and some additional poses may be recorded in different kiosks. The new images may then be used to improve the training of the machine-learning program. Because of the added information, the kiosk periodically retrains the machine-learning program to improve accuracy. For example, the kiosk may be retrained every week, but in other embodiments, the kiosk may be trained daily or monthly, or every certain number of days in the range between two days and 180 days.

As a result of the continuous retraining, the accuracy of image-based recognition keeps improving over time. Kiosks benefit from the transactions taking place in other kiosks to increase the number of available images. For example, a company may want to deploy a thousand kiosks in different locations. By leveraging the data in the global database, the company may change the implementation time for each kiosk from a few days to a few hours, or even less. In some example embodiments, a configuration of items may be transmitted to the kiosk from the global server so the user does not have to configure the items manually at each kiosk. As a result, adding a new kiosk may take minutes instead of days.

Referring now to the flowchart for the method 1000, at operation 1002, transaction images are added to the training set at one or more kiosks, and these images are sent to the a global server. At operation 1004, additional images are downloaded from the global server, where the additional images may come from any kiosk implementing the same menu items.

At operation 1006, the machine-learning program is retrained based on the new downloaded item data, as well as the previously existing data. This means that the training data keeps improving with the addition of new images. This creates a feedback loop that feeds additional images to the system, and these additional images are used to improve the object recognition accuracy.

FIG. 11 illustrates the data stored in a transactions database 1102, according to some example embodiments. In some example embodiments, the transactions database 1102 includes the following fields: transaction ID, kiosk ID, images from a plurality of cameras for the transaction (e.g., image 1 to image 8, but a different number of cameras is also possible), a 3D point cloud for the item (or items) in the transaction, a 3D mesh for the item (or items) in the transaction, date and time, item description (and/or item identifier), identity of the payer, amount of the transaction, and notes. The database may also include other fields capturing transaction data.

In some example embodiments, after the 3D images of the item are captured (assuming only one item is present in the transaction), the 3D data from all the cameras is combined to create a 3D model of the item, referred to as the 3D point cloud. The 3D image data includes image information about each pixel (e.g., RGB values), as well as three-dimensional coordinates for the pixels. Since the cameras are calibrated, it is possible to combine the 3D image data from all the cameras into a common reference system. Based on all the data and the common reference system, the 3D model of the item is created, which includes the locations in space of the pixels associated with the item. It is to be noted that the background pixels are removed before performing object recognition.

Based on the 3D point cloud, a 3D mesh for the object is created, where the mesh includes a plurality of polygons that approximate the surfaces of the object. In one example embodiment, the polygons are triangles and the 3D mesh includes triangles approximating the contours of the surfaces.

It is to be noted that the embodiments illustrated in FIG. 11 are examples and do not describe every possible embodiment. Other embodiments may utilize fewer fields, additional fields, etc. The embodiments illustrated in FIG. 11 should therefore not be interpreted to be exclusive or limiting, but rather illustrative.

Figure 12:
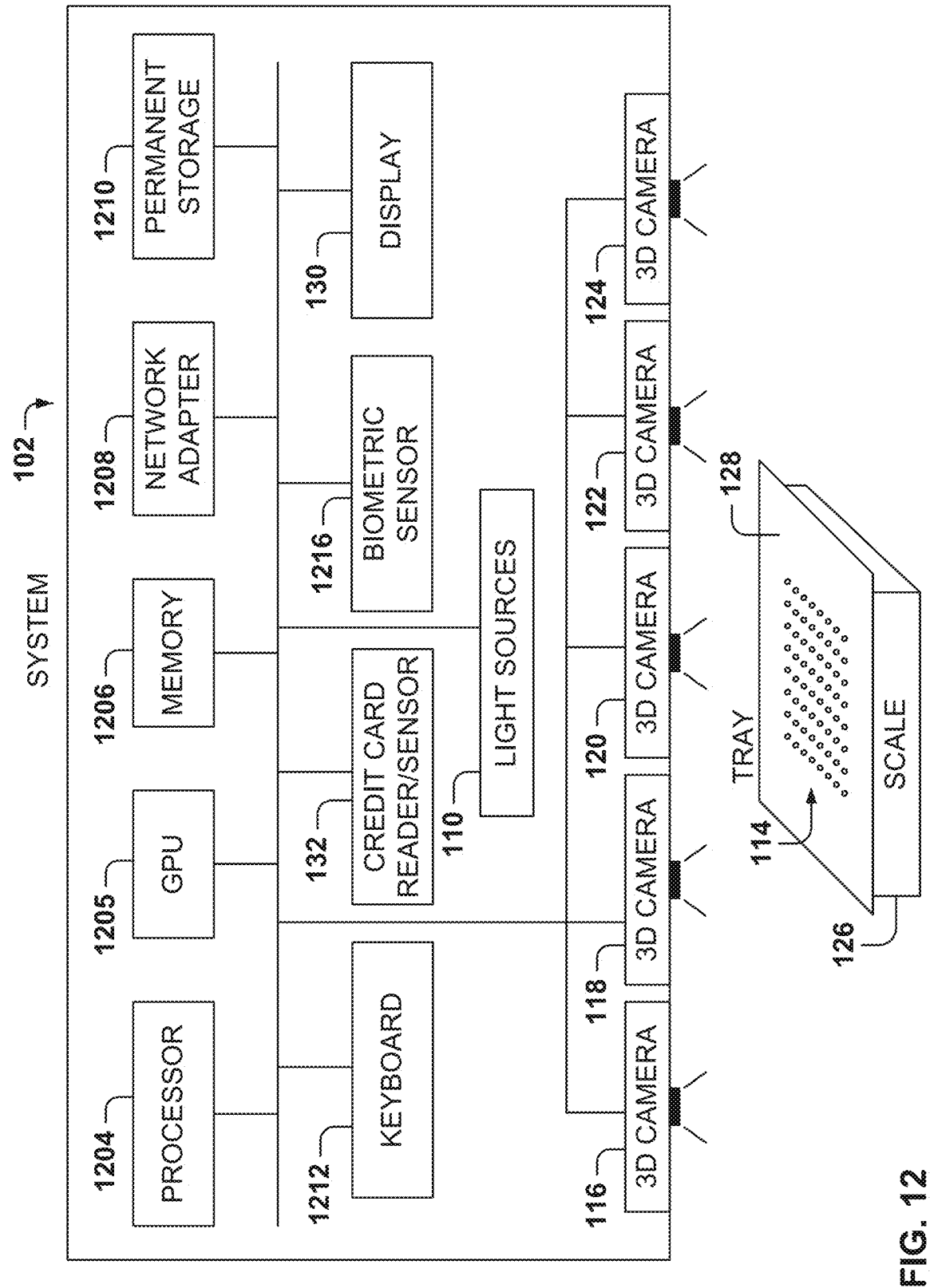
FIG. 12 illustrates the components of the object recognition system, according to an example embodiment.

FIG. 12 illustrates the components of the object recognition system 102, according to an example embodiment. In some example embodiments, the object recognition system 102 includes a processor 1204 for executing computer instructions of the programs described herein, a graphics processing unit (GPU) 1205, a memory 1206 for storing digital data (e.g., image capture data), a network adapter 1208, and permanent storage 1210. The GPU 1205 includes a plurality of cores and a GPU memory, and the GPU cores may also execute the computer instructions of the programs described herein.

The network adapter 1208 provides wired or wireless communications to connect the object recognition system 102 to a network (e.g., the Internet) or to other devices, such as user smart phones, tablets, and the like. The network adapter 1208 may support standard Internet protocols (e.g., TCP/IP, UDP, 802.x) and other protocols for local communications, such as Bluetooth®, Wi-Fi®, infrared or ultrasonic device protocols, credit card protocols, Body Area Network protocols, and so forth. The permanent storage 1210 may store computer programs or computer data, such as 3D object models and system configuration parameters.

The object recognition system 102 further includes a keyboard 1212, a card reader 132, one or more biometric sensors 1216, one or more displays 130 (which may include a touchscreen), and one or more light sources 110. The keyboard 1212 may be used to enter data, such as configuration data or item descriptions. The card reader 132 is used for reading credit card information, which may be transmitted to a remote location via the network adapter 1208. The biometric sensor 1216 is used to capture user information, such as a fingerprint or a retina scan. The one or more displays 130 are used to present information, such as an item name, item description, item price, item weight, total due, and the like. The one or more light sources 110 may be distributed across a certain volume in order to provide adequate illumination to objects placed in the volume of interest for recognizing the objects (e.g., over the base 128).

The object recognition system 102 further includes a plurality of 3D cameras 116, 118, 120, 122, and 124, the base 128, and a scale 126 for weighing items placed on the base 128. The 3D cameras may be of different types, such as a stereo camera, a structured-light camera, a range camera, and so forth. Different types of cameras may be used simultaneously because the calibration process enables transforming the data from all of the cameras into a compatible format to build 3D object models.

In general, each type of 3D camera has strengths and weaknesses. By combining at least two of the different types of 3D cameras, it is possible to leverage their respective strengths. In some example embodiments, four stereo cameras and one structured-light 3D camera are utilized, but other embodiments may utilize other camera combinations.

A stereo camera is a type of camera with two or more lenses with a separate image sensor or film frame for each lens. This allows the camera to simulate human binocular vision, and therefore gives it the ability to capture 3D images, a process known as stereo photography. Structured-light 3D cameras, also referred to as structured-light 3D scanners, project a pattern of light on the subject and measure the deformation of the pattern on the subject. The pattern is projected onto the subject using either a projector or another stable light source. The camera, offset slightly from the pattern projector, measures the shape of the pattern and calculates the distance of every point in the field of view.

One of the advantages of 3D cameras is their speed. Instead of scanning one point at a time, structured-light scanners scan multiple points or the entire field of view at once. Scanning an entire field of view in a fraction of a second reduces or eliminates the problem of distortion from motion.

In some example embodiments, other types of cameras may also be used, such as infrared cameras, depth cameras, ultraviolet cameras, regular two-dimensional (2D) cameras, and the like. Information provided by each camera is combined with the information provided by the other cameras, although some cameras may only provide depth information or color information.

In some example embodiments, the top surface of the base 128 includes a calibration pattern 114 used for calibrating the 3D cameras. In some example embodiments, the calibration pattern includes a plurality of circles arranged on a grid pattern. However, other embodiments may utilize other patterns, as long as the pattern is known by the object recognition system 102. For example, the pattern may include one or more rectangles, a photograph, one or more triangles, or combinations of different shapes, such as rectangles, circles, triangles, and so forth.

It is to be noted that the calibration pattern does not have to be visible during object recognition, because the pattern is needed for the calibration phase. For example, a user may place a cafeteria tray on the base 128 and the object recognition system 102 will proceed to identify the objects on the base 128, such as a bottle, a can, a bag of chips, a plate with a salad, and so forth. In some example embodiments, once the objects are recognized, the system may calculate a total bill based on the respective prices of the identified objects. Further, the system may ask the user to place a salad plate separately on the base 128 in order to weigh a salad that is priced by weight.

It is to be noted that the embodiments illustrated in FIG. 12 are examples and do not describe every possible embodiment. Other embodiments may utilize fewer components or additional components. The embodiments illustrated in FIG. 12 should therefore not be interpreted to be exclusive or limiting, but rather illustrative.

Figure 13:
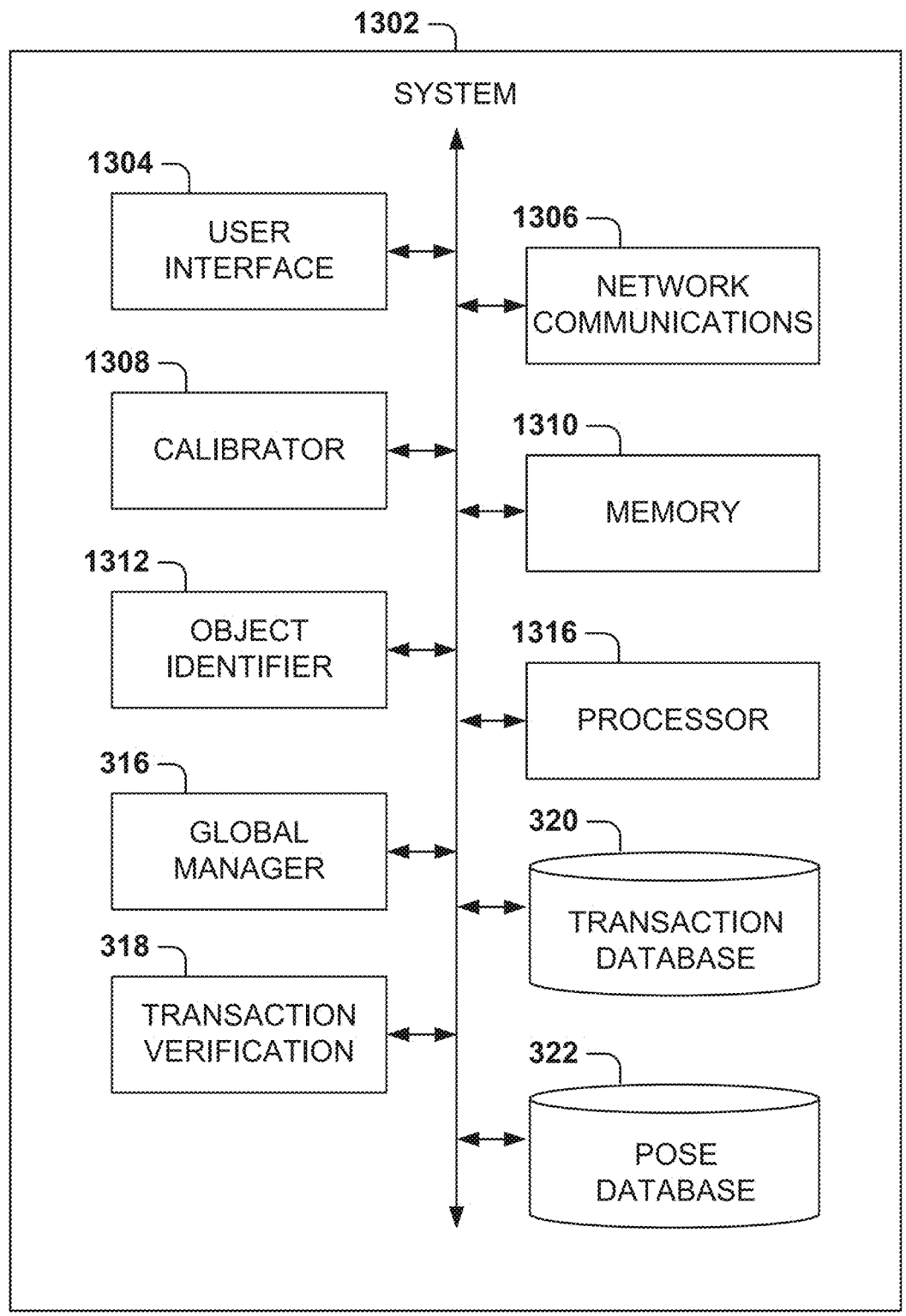
FIG. 13 illustrates some of the system components, according to some example embodiments.

FIG. 13 illustrates some of the system components, according to some example embodiments. In some example embodiments, a system 1302 includes a user interface 1304, a calibrator 1308, an object identifier 1312, a processor 1316, network communications 1306, a memory 1310, a global manager 316, a transaction verification module 318, a global transaction database 320, and a global pose database 322.

The user interface 1304 creates the user interface data for presenting the user interface at a display, a client device, or a server. For example, the user interface 1304 may include a user interface for configuring the object recognition system, for entering system data, for presenting identification of objects, for presenting a bill to a user, for communicating a message to the user (e.g., "place the salad plate on the tray by itself for weighing"), and so forth.

The network communications 1306 provide communications to other devices, such as communication with the server, another client, a smart phone of the user, and so forth. The calibrator 1308 is used to perform calibration of the object recognition system, including calibrating the cameras to a common coordinate system. The object identifier 1312 performs object recognition on the objects placed on the tray. In some example embodiments, the object recognition is performed by a machine-learning program, but other types of object recognition may be utilized based on the 3D data captured for each of the objects.

The memory 1310 contains program instructions for the different programs and also may be used by the processor 1316 during operation to store program data. The global manager 316 and the transaction verification module 318 perform different system operations, such as entering or updating price information, uploading and downloading transaction and pose image data, adding or deleting items to or from the transaction database, communicating with a server or other object recognition systems, uploading or downloading system configuration, and so forth.

The processor 1316 executes the program instructions for the different programs, and the databases store object data (e.g., 3D models for the configured objects) and calibration data. Other databases (not shown) may also be included to store other types of data, such as price lists, user accounts, credit card server information, support server information, and so forth.

It is to be noted that the embodiments illustrated in FIG. 13 are examples and do not describe every possible embodiment. Other embodiments may utilize additional components, combine the functionality of two or more programs into a single program, have fewer components, and so forth. The embodiments illustrated in FIG. 13 should therefore not be interpreted to be exclusive or limiting, but rather illustrative.

Figure 14:
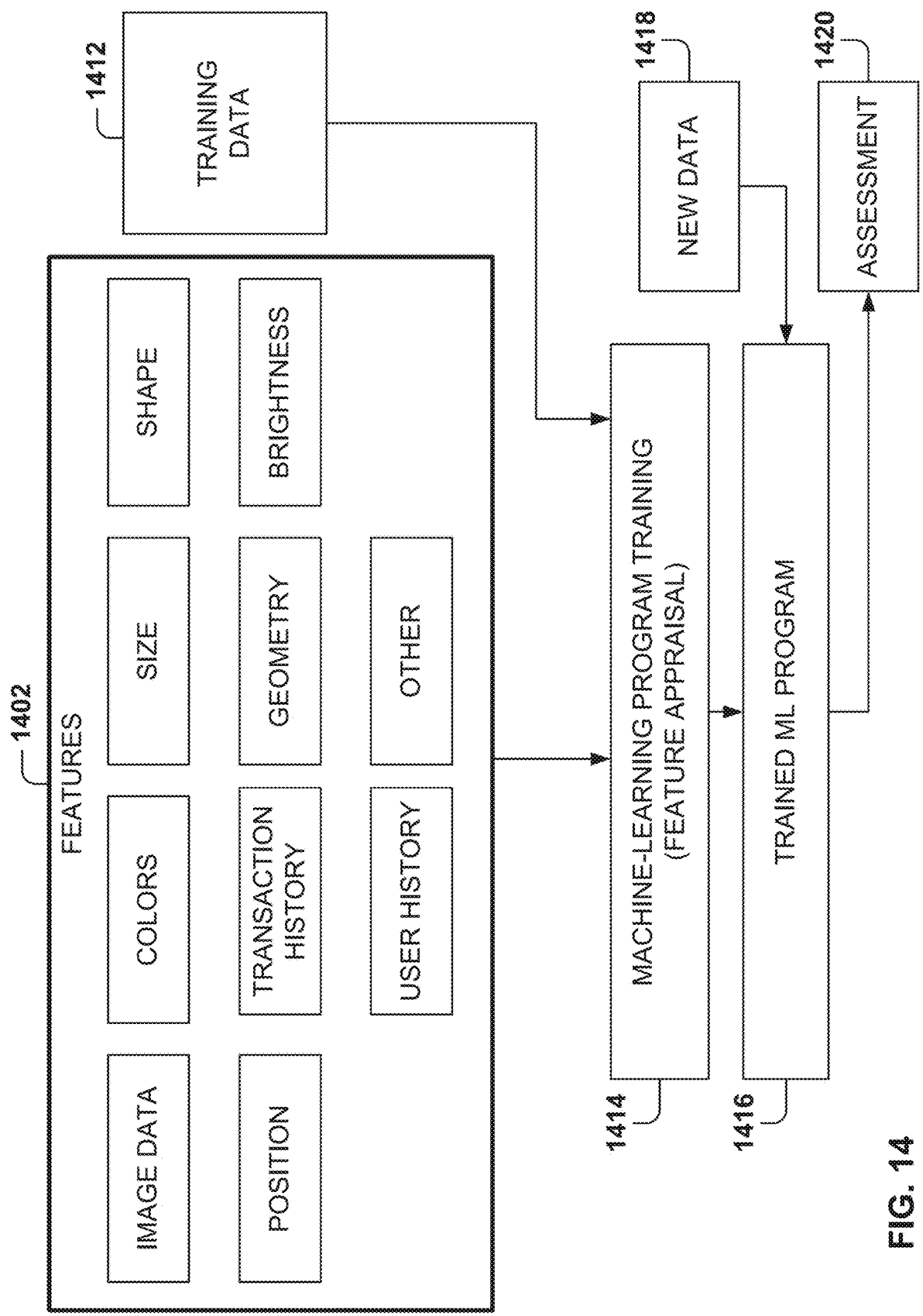
FIG. 14 illustrates the training and use of a machine-learning program, according to some example embodiments.

FIG. 14 illustrates the training and use of a machine-learning program, according to some example embodiments. In some example embodiments, machine-learning programs (MLPs), also referred to as machine-learning algorithms or tools, are utilized to perform operations associated with image-based recognition.

Machine learning is a field of study that gives computers the ability to learn without being explicitly programmed. Machine learning explores the study and construction of algorithms, also referred to herein as tools, that may learn from existing data and make predictions about new data. Such machine-learning tools operate by building a model from example training data 1412 to make data-driven predictions or decisions expressed as outputs or assessments 1420. Although example embodiments are presented with respect to a few machine-learning tools, the principles presented herein may be applied to other machine-learning tools.

In some example embodiments, different machine-learning tools may be used. For example, Logistic Regression (LR), Naive-Bayes, Random Forest (RF), neural networks (NN), matrix factorization, and Support Vector Machines (SVM) tools may be used for image-based recognition.

Two common types of problems in machine learning are classification problems and regression problems. Classification problems, also referred to as categorization problems, aim at classifying items into one of several category values (for example, is this object an apple or an orange?). Regression problems aim at quantifying some items (for example, by providing a value that is a real number).

In some embodiments, example machine-learning algorithms are used at the kiosk to perform image-based recognition. If several items are detected in the examination space, the items are separated and separate geometric models of each item are created (e.g., the 3D point cloud, the 3D mesh). The machine-learning algorithms utilize the training data 1412 to find correlations among identified features 1402 that affect the outcome.

The machine-learning algorithms utilize the features 1402 for analyzing the data to generate assessments 1420. A feature 1402 is an individual measurable property of a phenomenon being observed. The concept of a feature is related to that of an explanatory variable used in statistical techniques such as linear regression. Choosing informative, discriminating, and independent features is important for effective operation of the MLP in pattern recognition, classification, and regression. Features may be of different types, such as numeric features, strings, and graphs.

In one example embodiment, the features 1402 may be of different types and may include one or more of image data, colors, size, shape, position, transaction history, geometry (e.g., 3D point cloud, 3D mesh), brightness, user history, and others. The machine-learning algorithms utilize the training data 1412 to find correlations among the identified features 1402 that affect the outcome or assessment 1420. In some example embodiments, the training data 1412 includes known data for one or more identified features 1402 and one or more outcomes, such as captured images of items and the corresponding item identifications.

With the training data 1412 and the identified features 1402, the machine-learning tool is trained at operation 1414. The machine-learning tool appraises the value of the features 1402 as they correlate to the training data 1412. The result of the training is a trained machine-learning program 1416.

When the trained machine-learning program 1416 is used to perform an assessment, new data 1418 is provided as an input to the trained machine-learning program 1416, and the trained machine-learning program 1416 generates the assessment 1420 as output. For example, when an item is placed in the examination space, the captured image data, and other derived data (e.g., geometric models), are used to identify the item. In some example embodiments, the training data 1412 includes the pose data and the transaction data captured for the item, as described above.

Figure 15:
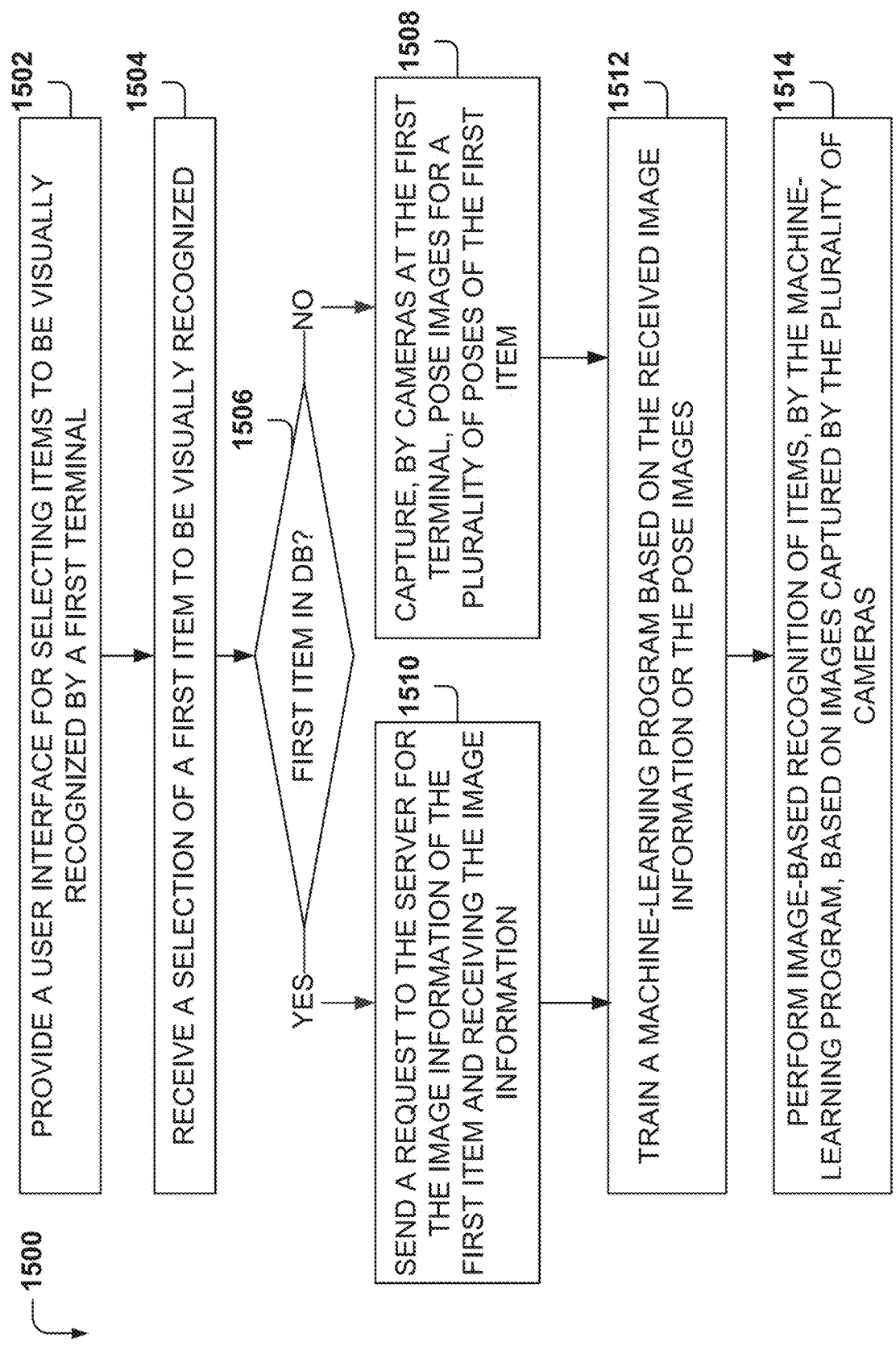
FIG. 15 is a flowchart of a method, according to some example embodiments, for providing a feedback loop to improve object image-based recognition based on transaction data.

FIG. 15 is a flowchart of a method 1500 for providing a feedback loop to improve object image-based recognition based on transaction data, according to some example embodiments, for performing damage simulations. While the various operations in this flowchart are presented and described sequentially, one of ordinary skill will appreciate that some or all of the operations may be executed in a different order, be combined or omitted, or be executed in parallel.

At operation 1502, one or more processors provide a user interface for selecting items to be visually recognized by a first terminal. The user interface provides options to select the items from a database coupled to a server or to select new items that are not in the database, which comprises a plurality of items and image information that has been captured during transactions performed at the first terminal and at other terminals.

From operation 1502, the method flows to operation 1504 for receiving, by the one or more processors, a selection of a first item to be visually recognized. At operation 1506, a check is made to determine if the first item is in the database. If the first item is in the database, the method flows to operation 1510, and in the first item is not in the database, the method flows to operation 1508.

At operation 1510, the one or more processors send a request to the server for the image information of the first item from the database and receive the image information from the server. At operation 1508, a plurality of cameras at the first terminal capture a plurality of pose images for a plurality of poses of the first item, each camera taking a pose image for each pose of the first item.

From operation 1510 or operation 1508, the method flows to operation 1512 for training, by the one or more processors, a machine-learning program based on the received image information or the plurality of pose images captured at the first terminal.

At operation 1514, the machine-learning program performs image-based recognition of the selected items to be visually recognized by the first terminal based on images captured by the plurality of cameras.

In one example, the method 1500 further comprises performing transactions at the first terminal after training the machine-learning program, the transactions comprising image-based recognition of items presented at the first terminal, and transmitting image information for the performed transactions to the server for storage in the database.

In one example, receiving the image information from the server further comprises receiving the image information via a network from the server, the image information comprising images of the first item, and storing the received image information at a local database at the first terminal.

In one example, the image information includes one or more of image data captured by each of the plurality of cameras, a three-dimensional (3D) point cloud resulting from combining the image data from the plurality of cameras, a 3D mesh created for the item, and an item identification.

In one example, the plurality of cameras are 3D cameras, wherein the image information includes 3D image data.

In one example, the image-based recognition is based on an appearance of the item, wherein the image-based recognition does not include checking a Universal Product Code (UPC) code against a list of known UPC codes.

In one example, the plurality of items includes one or more of a manufactured item, a salad, a pasta dish, a pizza box, fruit, and a vegetable.

In one example, capturing the plurality of pose images further comprises: providing instruction to a user to place the first item in an examination space of the first terminal; taking a pose image by each of the cameras; and repeating the providing the instruction and taking a pose image by each of the cameras while changing a pose of the first item until a predetermined number of pose images have been captured.

In one example, the database further includes pose images taken by cameras at the first terminal and cameras at the other terminals.

In one example, the method 1500 further comprises, before training the machine-learning program, creating additional images that are derived from the pose images, wherein the training is further based on the additional images to increase a number of available images of the first item for the training.

Figure 16:
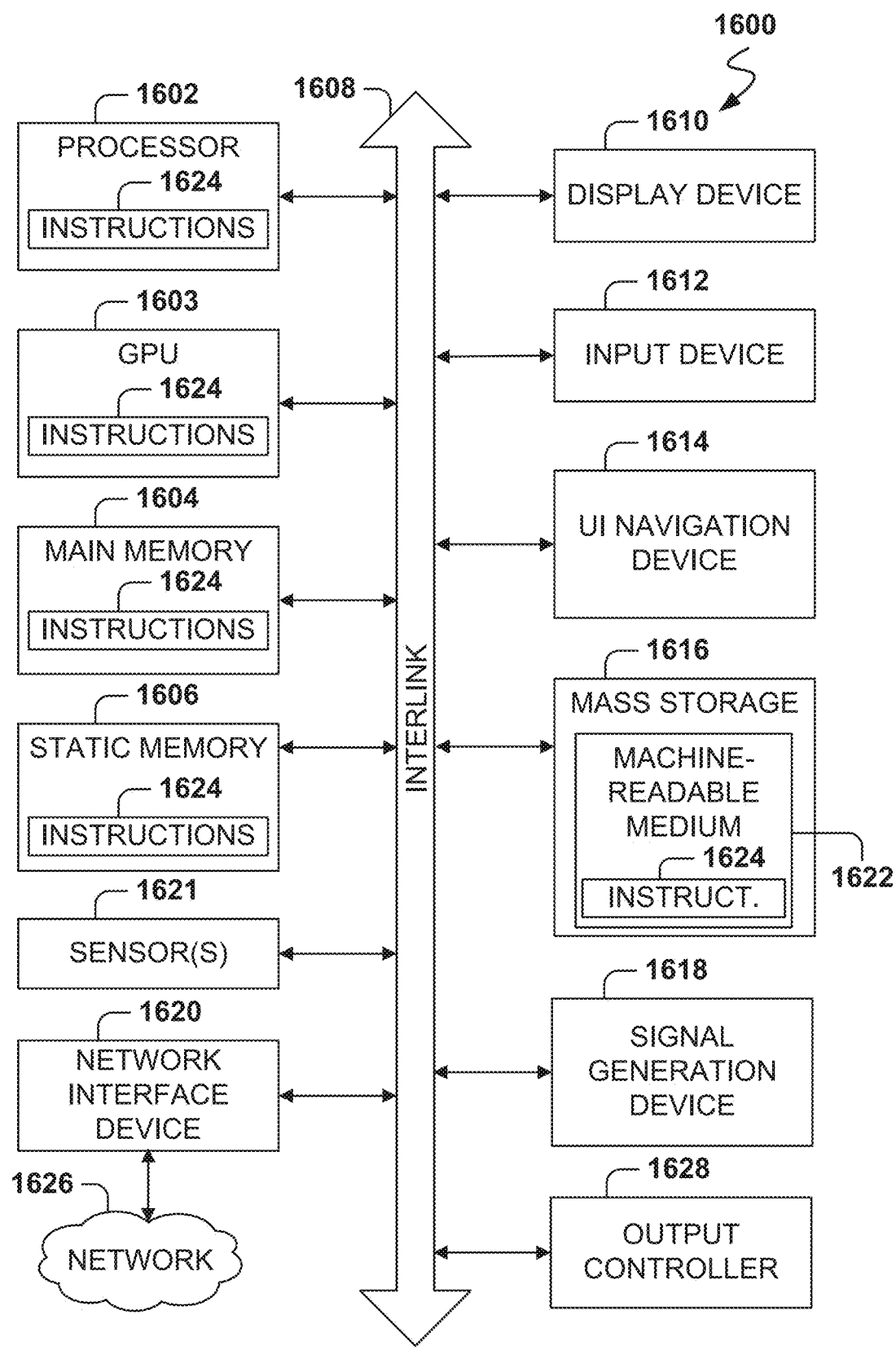
FIG. 16 is a block diagram illustrating an example of a machine upon which one or more example embodiments may be implemented. In alternative embodiments, the machine may operate as a standalone device or may be connected (e.g., networked) to other machines.

FIG. 16 is a block diagram illustrating an example of a machine 1600 upon which one or more example embodiments may be implemented. In alternative embodiments, the machine 1600 may operate as a standalone device or may be connected (e.g., networked) to other machines. In a networked deployment, the machine 1600 may operate in the capacity of a server machine, a client machine, or both in server-client network environments. In an example, the machine 1600 may act as a peer machine in a peer-to-peer (P2P) (or other distributed) network environment. The machine 1600 may be a personal computer (PC), a tablet, a set-top box (STB), a personal digital assistant (PDA), a mobile telephone, a web appliance, a network router, a network switch, a network bridge, or any machine capable of executing instructions (sequential or otherwise) that specify actions to be taken by that machine. Further, while only a single machine 1600 is illustrated, the term "machine" shall also be taken to include any collection of machines that individually or jointly execute a set (or multiple sets) of instructions to perform any one or more of the methodologies discussed herein, such as via cloud computing, software as a service (SaaS), or other computer cluster configurations.

Examples, as described herein, may include, or may operate by, logic, a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer-readable medium physically modified (e.g., magnetically, electrically, by moveable placement of invariant massed particles, etc.) to encode instructions of the specific operation. In connecting the physical components, the underlying electrical properties of a hardware constituent are changed (for example, from an insulator to a conductor or vice versa). The instructions enable embedded hardware (e.g., the execution units or a loading mechanism) to create members of the circuitry in hardware via the variable connections to carry out portions of the specific operation when in operation. Accordingly, the computer-readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry, at a different time.

The machine (e.g., computer system) 1600 may include a hardware processor 1602 (e.g., a central processing unit (CPU), a hardware processor core, or any combination thereof), a graphics processing unit (GPU) 1603, a main memory 1604, and a static memory 1606, some or all of which may communicate with each other via an interlink (e.g., bus) 1608. The machine 1600 may further include a display device 1610, an alphanumeric input device 1612 (e.g., a keyboard), and a user interface (UI) navigation device 1614 (e.g., a mouse). In an example, the display device 1610, alphanumeric input device 1612, and UI navigation device 1614 may be a touch screen display. The machine 1600 may additionally include a mass storage device (e.g., drive unit) 1616, a signal generation device 1618 (e.g., a speaker), a network interface device 1620, and one or more sensors 1621, such as a Global Positioning System (GPS) sensor, compass, accelerometer, or other sensor. The machine 1600 may include an output controller 1628, such as a serial (e.g., universal serial bus (USB)), parallel, or other wired or wireless (e.g., infrared (IR), near field communication (NFC), etc.) connection to communicate with or control one or more peripheral devices (e.g., a printer, card reader, etc.).

The mass storage device 1616 may include a machine-readable medium 1622 on which is stored one or more sets of data structures or instructions 1624 (e.g., software) embodying or utilized by any one or more of the techniques or functions described herein. The instructions 1624 may also reside, completely or at least partially, within the main memory 1604, within the static memory 1606, within the hardware processor 1602, or within the GPU 1603 during execution thereof by the machine 1600. In an example, one or any combination of the hardware processor 1602, the GPU 1603, the main memory 1604, the static memory 1606, or the mass storage device 1616 may constitute machine-readable media.

While the machine-readable medium 1622 is illustrated as a single medium, the term "machine-readable medium" may include a single medium or multiple media (e.g., a centralized or distributed database, and/or associated caches and servers) configured to store the one or more instructions 1624.

The term "machine-readable medium" may include any medium that is capable of storing, encoding, or carrying instructions 1624 for execution by the machine 1600 and that cause the machine 1600 to perform any one or more of the techniques of the present disclosure, or that is capable of storing, encoding, or carrying data structures used by or associated with such instructions 1624. Non-limiting machine-readable medium examples may include solid-state memories, and optical and magnetic media. In an example, a massed machine-readable medium comprises a machine-readable medium 1622 with a plurality of particles having invariant (e.g., rest) mass. Accordingly, massed machine-readable media are not transitory propagating signals. Specific examples of massed machine-readable media may include non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1624 may further be transmitted or received over a communications network 1626 using a transmission medium via the network interface device 1620 utilizing any one of a number of transfer protocols (e.g., frame relay, Internet Protocol (IP), Transmission Control Protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone Service (POTS) networks, and wireless data networks (e.g., Institute of Electrical and Electronics Engineers (IEEE) 802.11 family of standards known as Wi-Fi®, IEEE 802.16 family of standards known as WiMax®, IEEE 802.15.4 family of standards, and P2P networks, among others). In an example, the network interface device 1620 may include one or more physical jacks (e.g., Ethernet, coaxial, or phone jacks) or one or more antennas to connect to the communications network 1626. In an example, the network interface device 1620 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions 1624 for execution by the machine 1600, and includes digital or analog communications signals or other intangible media to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
   detecting, at a checkout apparatus a request for adding an item to be visually recognized during sales transactions;
   capturing and storing a color image, by each of one or more cameras of the checkout apparatus, of an examination space when the item is present in the examination space, wherein a user is collocated with the checkout apparatus;
   repeating the capturing and storing of color images of the item at different poses within the examination space until at least a predetermined threshold number of color images of the item are captured;
   generating, by a hardware processor of the checkout apparatus, additional color images of the item by modifying the captured color images;
   building a machine-learning model for item recognition, at the checkout apparatus, by training a machine-learning tool with the captured color images and the additional color images; and
   rebuilding the machine-learning model with transaction data, wherein the transaction data comprises a transaction image of the item during operation, associated with an item identifier and a note, wherein the note comprises information about a purchase state.

2. The method of claim 1, comprising:
   storing transaction data of items obtained during sales transactions;
   wherein the machine-learning model is rebuilt with the captured color images and the additional color images.

3. The method of claim 1, wherein the transaction data for each sales transaction comprises color images captured by the one or more cameras, a 3D point cloud for the item, and a 3D mesh for the item.

4. The method of claim 1, comprising:
   for each pose, generating a 3D point cloud of the item and a 3D mesh for the item; and
   for each additional color image, generating a 3D point cloud associated with the additional color image and a 3D mesh associated with the additional color image, wherein training the machine-learning tool comprises utilizing the 3D point clouds and the 3D meshes for the poses and for the additional color images.

5. The method of claim 1, comprising:
configuring the checkout apparatus to recognize, by the machine-learning model, a purchase of the item during a sales transaction at the checkout apparatus based on color images of the examination space that include the item.

6. The method of claim 1, comprising:
before capturing the color image, prompting, on a display of the checkout apparatus, the user to place the item in an examination space of the checkout apparatus.

7. The method of claim 1, wherein generating the additional color images comprises modifying the captured color images by one or more of changing brightness, cropping, darkening, rotating, adding shadows, adding a partial block of the item, adding artificial shine, adding artificial lines, changing colors, or adding noise.

8. The method of claim 1, wherein generating the additional color images comprises modifying the captured color images by changing brightness, cropping, darkening, rotating, adding shadows, adding a partial block of the item, adding artificial shine, adding artificial lines, changing colors, and adding noise.

9. The method of claim 1, wherein the one or more cameras comprises a plurality of color three-dimensional (3D) cameras, and the hardware processor generates a 3D point cloud of the item by combining image data from the plurality of color 3D cameras.

10. The method of claim 1, wherein capturing and storing the color image comprises:
presenting a user interface for interacting with the user to capture the different poses of the item, the user interface comprising:
a message indicating a number of poses recorded;
a message indicating a recommended number of poses left; and
a selector to indicate when the item is ready for taking the pose;
detecting activation of the selector in the user interface; and
in response to the activation of the selector, capturing the color image, by each of one or more cameras of the checkout apparatus, of the examination space.

11. The method of claim 10, comprising:
updating the messages in the user interface after capturing the color image; and
presenting the color image captured by each of the one or more cameras in the user interface.

12. The method of claim 10, wherein the user interface comprises options for accessing control settings for the checkout apparatus, starting checkout transactions, starting training of new items, presenting checkout apparatus information, and performing a camera calibration operation.

13. The method of claim 10, wherein the user interface comprises a screen for presenting the captured color images of the item, the screen comprising an option for selecting an item for which the machine-learning model has already been trained and a window for presenting color images of the item.

14. The method of claim 1, wherein the machine-learning model is used to analyze a plurality of features for recognizing items, the plurality of features including color, size, and shape of the item.

15. The method of claim 14, wherein the plurality of features comprises any combination of color, size, shape, position, transaction history, geometry, and brightness of the item.

16. The method of claim 1, comprising:
presenting a message, on a display, prompting the user to place the item in the examination space in a new pose.

17. The method of claim 1, comprising:
sending, via a network, the captured color images of the item to a central database that stores image information captured by a plurality of checkout apparatus interconnected by the network.

18. The method of claim 1, comprising:
accessing, by another checkout apparatus, the captured color images and the additional color images from the checkout apparatus; and
building, at the other checkout apparatus, a machine-learning model at the other checkout apparatus for item recognition by training a machine-learning tool, at the other checkout apparatus, with the captured color images and the additional color images.

19. The method of claim 1, comprising:
accessing, by another checkout apparatus, the captured color images and the additional color images from the checkout apparatus;
accessing, by the other checkout apparatus, the transaction images of items obtained during sales transactions at the checkout apparatus; and
building, at the other checkout apparatus, a machine-learning model at the other checkout apparatus for item recognition by training a machine-learning tool, at the other checkout apparatus, with the captured color images, the additional color images, and the transaction images.

20. A checkout apparatus comprising:
a display;
one or more cameras for capturing color images of an examination space of the checkout apparatus;
a memory comprising instructions; and
one or more processors, wherein the instructions, when executed by the one or more processors, cause the one or more processors to perform operations comprising:
detecting a request for adding an item to be visually recognized during sales transactions;
capturing and storing a color image, by each of one or more cameras of the checkout apparatus, of the examination space when the item is present in the examination space, wherein a user is collocated with the checkout apparatus;
repeating the capturing and storing of color images of the item at different poses within the examination space until at least a predetermined threshold number of color images of the item are captured;
generating additional color images of the item by modifying the captured color images;
building a machine-learning model for item recognition, at the checkout apparatus, by training a machine-learning tool with the captured color images and the additional color images; and
rebuilding the machine-learning model with transaction data generated during sales transactions, wherein the transaction data comprises a transaction image of the item during operation, associated with an item identifier and a purchase state.

21. The checkout apparatus of claim 20, wherein the instructions cause the one or more processors to perform operations comprising:
storing transaction data of items obtained during sales transactions; and
rebuilding the machine-learning model with the captured color images and the additional color images.

22. The checkout apparatus of claim 21, wherein the transaction data for each sales transaction comprises color images captured by the one or more cameras, a 3D point cloud for the item, and a 3D mesh for the item.

23. The checkout apparatus of claim 20, wherein the instructions cause the one or more processors to perform operations comprising:
for each pose, generating a 3D point cloud of the item and a 3D mesh for the item; and
for each additional color image, generating a 3D point cloud associated with the additional color image and a 3D mesh associated with the additional color image, wherein training the machine-learning tool comprises utilizing the 3D point clouds and the 3D meshes for the poses and for the additional color images.

24. The checkout apparatus of claim 20, comprising receiving an instruction to enter a sales mode where the checkout apparatus recognizes, by the machine-learning model, a purchase of the item during a sales transaction at the checkout apparatus based on color images of the examination space that include the item.

25. The checkout apparatus of claim 20, wherein generating additional color images comprises modifying the captured color images by one or more of changing brightness, cropping, darkening, rotating, adding shadows, adding a partial block of the item, adding artificial shine, adding artificial lines, changing colors, or adding noise.

26. The checkout apparatus of claim 20, wherein generating the additional color images comprises modifying the captured color images by changing brightness, cropping, darkening, adding shadows, adding a partial block of the item, adding artificial shine, adding artificial lines, changing colors, and adding noise.

27. The checkout apparatus of claim 20, wherein the one or more cameras comprise a plurality of color three-dimensional (3D) cameras, and the one or more processors generate a 3D point cloud of the item by combining image data from the plurality of color 3D cameras.

28. The checkout apparatus of claim 20, wherein the instructions cause the one or more processors to perform operations comprising:
presenting, on a display of the checkout apparatus, a user interface for displaying the captured color images, a number of poses captured of the item, and a selector to indicate when the item is ready for the image capturing.

29. A non-transitory machine-readable storage medium comprising instructions that, when executed by a machine, cause the machine to perform operations comprising:
detecting, at a checkout apparatus, a request for adding an item to be visually recognized during sales transactions;
capturing and storing a color image, by each of one or more cameras of the checkout apparatus, of an examination space when the item is present in the examination space, wherein a user is collocated with the checkout apparatus;
repeating the capturing and storing of color images of the item at different poses within the examination space until at least a predetermined threshold number of color images of the item are captured;
generating, by a hardware processor of the checkout apparatus, additional color images of the item by modifying the captured color images;
building a machine-learning model for item recognition, at the checkout apparatus, by training a machine-learning tool with the captured color images and the additional color images; and
rebuilding the machine-learning model with transaction data generated during sales transactions, wherein the transaction data comprises a transaction image of the item during operation, associated with an item identifier and a purchase state for the respective sales transaction.

30. The method of claim 1, wherein the purchase state comprises one of a purchased state and a refunded state; wherein the machine-learning model is rebuilt with transaction data associated with a purchased state.

* * * * *